(12) United States Patent
Bonta et al.

(10) Patent No.: US 9,510,061 B2
(45) Date of Patent: Nov. 29, 2016

(54) METHOD AND APPARATUS FOR DISTRIBUTING VIDEO

(75) Inventors: Jeffrey D. Bonta, Arlington Heights, IL (US); Kevin L. Baum, Rolling Meadows, IL (US); George Calcev, Hoffman Estates, IL (US); Benedito J. Fonseca, Jr., Glen Ellyn, IL (US)

(73) Assignee: ARRIS Enterprises, Inc., Suwanee, GA (US)

( * ) Notice: Subject to any disclaimer, the term of this patent is extended or adjusted under 35 U.S.C. 154(b) by 939 days.

(21) Appl. No.: 12/959,580

(22) Filed: Dec. 3, 2010

(65) Prior Publication Data

US 2012/0144445 A1 Jun. 7, 2012

(51) Int. Cl.
| | |
|---|---|
| H04N 21/6405 | (2011.01) |
| H04N 21/235 | (2011.01) |
| H04L 12/18 | (2006.01) |
| H04N 21/262 | (2011.01) |
| H04N 21/414 | (2011.01) |
| H04N 21/61 | (2011.01) |
| H04N 21/6375 | (2011.01) |
| H04N 21/6408 | (2011.01) |

(Continued)

(52) U.S. Cl.
CPC ...... *H04N 21/6405* (2013.01); *H04L 12/1868* (2013.01); *H04L 65/1069* (2013.01); *H04L 65/4076* (2013.01); *H04L 65/602* (2013.01); *H04L 65/608* (2013.01); *H04L 65/80* (2013.01); *H04N 21/2187* (2013.01); *H04N 21/2358* (2013.01); *H04N 21/26258* (2013.01); *H04N 21/41407* (2013.01); *H04N 21/6131* (2013.01); *H04N 21/6375* (2013.01); *H04N 21/6408* (2013.01); *H04N 21/64784* (2013.01); *H04N 21/8456* (2013.01)

(58) Field of Classification Search
CPC ..................... H04N 21/64; H04N 21/26616
See application file for complete search history.

(56) References Cited

U.S. PATENT DOCUMENTS

| | | |
|---|---|---|
| 6,148,005 A | 11/2000 | Paul |
| 7,324,555 B1 | 1/2008 | Chen et al. |

(Continued)

FOREIGN PATENT DOCUMENTS

| | | |
|---|---|---|
| WO | 2010108053 A1 | 9/2010 |
| WO | 2011054377 A1 | 5/2011 |

OTHER PUBLICATIONS

3GPP, "Technical Specification Group Services and Systems Aspects: Enhancements to IMS Service functionalities facilitating multicast bearer services", (Release 8), Dec. 17, 2007, pp. 1-19, vol. SA WG2, No. V8.0.0., Sophia-Atipolis Cedex; France.*

(Continued)

Primary Examiner — Omar S Parra
(74) Attorney, Agent, or Firm — Thomas A. Ward

(57) ABSTRACT

A method and apparatus for distributing live video to multiple client devices is provided herein. In particular, a router is provided that acts on behalf of all client devices in its network. The router serves multiple groups of client devices with each group being formed by client devices having similar bandwidth requirements. The router then requests and receives video chunks from a network. The router then redistributes the video chunks to the multiple client devices using a multicast transmission. In particular, to minimize the demands on the core network, the router sets up a separate multicast to each group. Live video, of the appropriate quality is then multicast to each group.

6 Claims, 20 Drawing Sheets

(51) Int. Cl.
*H04N 21/647* (2011.01)
*H04N 21/845* (2011.01)
*H04N 21/2187* (2011.01)
*H04L 29/06* (2006.01)

(56) References Cited

U.S. PATENT DOCUMENTS

| | | | |
|---|---|---|---|
| 8,031,701 B2* | 10/2011 | Oran | 370/356 |
| 2005/0002337 A1 | 1/2005 | Wang et al. | |
| 2007/0005804 A1 | 1/2007 | Rideout | |
| 2010/0146040 A1 | 6/2010 | Ramakrishnan | |
| 2010/0169303 A1* | 7/2010 | Biderman et al. | 707/723 |
| 2011/0080940 A1* | 4/2011 | Bocharov | H04N 21/4331 375/240.01 |
| 2011/0082924 A1 | 4/2011 | Gopalakrishnan | |
| 2012/0297410 A1* | 11/2012 | Lohmar | H04N 21/2407 725/14 |
| 2013/0003579 A1* | 1/2013 | Lu et al. | 370/252 |

OTHER PUBLICATIONS

3GPP TS 26.cde v0.0.3 (Jun. 2010), 3rd Generation Partnership Project; Technical Specification Group Services and System Aspects Transparent end-to-end Packet-switched Streaming Service (PSS); HTTP-based Streaming and Download (HSD) (Release 10), 3GPP Draft; Draft TS 26.2XX-HSD-V8.8.3, 3rd Generation Partnership Project (3GPP), Mobile Competence Centre; 658, Route Des Lucioles ; F-86921 Sophia-Antipolis Cedex; France, vol. SA WG4, No. Prague, Czech Republic;28188621, Jun. 23, 2010, all pages.

Pantos, R: "HTTP Live Streaming", Internet Citation, Jun. 8, 2009, pp. 1-17, Retrieved from the Internet: URL:http://tools.ietf.org/html/draft-pantos-http-live-streaming-01 [retrieved on Jun. 8, 2009], all pages.

Patent Cooperation Treaty, International Search Report and Written Opinion of the International Searching Authority for International Application No. PCT/US2011/062065, Feb. 20, 2012, 15 pages.

Liu, Jiangchuan et al.: "Adaptive video Multicast over the Internet", IEEE Multimedia, vol. 10, No. 1, pp. 22-33, Jan. 2003, DOI: 10.1109/mmul.203.1167919.

Bouras, Christos et al.: "Performance Evaluation of Simulcast vs. Layered Multicasting over Best-Effort Networks", SoftCOM'09 Proceedings of the 17th international conference on Software, Telecommunications and Computer Networks, IEEE Press Piscataway, NJ, USA 2009, pp. 338-342.

Thomas, V.: IP Multicast in RealSystem G2, White paper, RealNetworks, (1998), all pages.

Pulier, Greg: "Hybrid Flash Multicasting: The Next Generation of Enterprise Video", http://ajax.sys-con.com/node/1578654 (last visited Nov. 16, 2010), all pages.

Siglin, Tim: "First Look: Flash Media Server 4", http://www.streamingmedia.com/Articles/ReadArticle.aspx?ArticleID=69867&PageNum=1 (last visited Nov. 16, 2010), all pages.

Siglin, Tim: "First Look" Microsoft IIS Media Services 4, http://www.streamingmediaglobal.com/Articles/ReadArticle.aspx?ArticleID=71108&PageNum=1, (last visited Nov. 16, 2010), all pages.

Bica, I et al.: "An IP multicast—HTTP Gateway for reliable streaming in heterogeneous networks", Communications (COMM), 2010 8th International Conference on, Jun. 10-12, 2010, Bucharest, pp. 389-392.

* cited by examiner

TYPICAL HTTP LIVE STREAMING
VARIANT PLAYLIST WITH MULTICAST
ENABLERS:

EXTM3U

EXT-CONTENT-TYPE:LIVE

EXT-X-STREAM-INF:PROGRAM-ID=1,
BANDWIDTH=1280000

HTTP://EXAMPLE.COM/LOW.M3U8

EXT-X-STREAM-INF:PROGRAM-ID=1,
BANDWIDTH=2560000

HTTP://EXAMPLE.COM/MEDIUM.M3U8

EXT-X-STREAM-INF:PROGRAM-ID=1,
BANDWIDTH=7680000

HTTP://EXAMPLE.COM/HIGH.M3U8

*FIG. 3*

METHOD AND APPARATUS FOR DISTRIBUTING VIDEO

RELATED APPLICATIONS

The present invention is related to U.S. patent application Ser. No. 12/959,609, filed on the same day as the present application.

FIELD OF THE INVENTION

The present invention relates generally to the distribution of video to multiple devices and in particular, to a method and apparatus for distributing video to multiple devices.

BACKGROUND OF THE INVENTION

In recent years, video streaming has gained more attention from the communications industry, especially video streaming to wireless devices. One of the problems to cope with live video streaming to wireless devices is the variability of channel bandwidth. A media file (movie, song) is usually encoded to a certain bit rate. Therefore the transport of a media file between a server and a client requires a channel that has a minimum bandwidth capable of supporting the coding rate of the media. A higher encoding rate implies a better quality of the movie or song and translates into a larger size of the corresponding file and therefore a need for higher bandwidth.

Recently, there has been significant interest in transport methods based on the HTTP and TCP protocols. Such methods can be called "pull-based" methods because the transport of a presentation is controlled by the client device. Examples of such methods are Apple's HTTP Live Streaming and Microsoft's Smooth Streaming.

In pull-based transport methods, the presentation is segmented into multiple "chunks" of data, which are stored in a server. Individual chunks of data may represent the same portion of a presentation, but have differing encoding rates. The client device issues HTTP requests (GET) to the server for chunks of the presentation. The requested chunk is then transferred to the client device using the TCP/IP protocol. The chunks are grouped based on their encoding rate. Chunks in the same group have the same encoding rate and the same time duration of the media. Therefore, each group corresponds to a specific bandwidth. The client runs a download algorithm, which selects and downloads the next chunk of a presentation. The download algorithm tries to match the bandwidth required by the chunk's rate to the actual bandwidth offered by the communication channel.

In order to know how many and which chunks can be requested, each presentation has an associated "playlist". The playlist is a text-file that contains information about how the presentation was segmented and the name and the location of each of the chunks. The playlists are organized in a hierarchical structure. There is a main playlist named "variant playlist". The variant playlist specifies the names, the bandwidth and the location of other derived playlists. Each of these derived playlists store the URIs for the chunks that belong to the same coding rate. A derived playlist is also sometimes referred to as a simple playlist. Non-hierarchical structures are also possible for a playlist.

In certain implementations (e.g., a client device using the Android™ operating system), the client device is responsible for downloading these playlists. The download manager node downloads and parses the variant playlist and then the derived playlist to match the estimated bandwidth of the channel. When the estimation of the channel bandwidth changes, the download manager selects a different derived playlist and downloads the next file from that playlist. For live presentations, the derived playlist is dynamic in nature since the presentation is ongoing and since the server may not retain older portions of the presentation. In this case, the derived playlist is referred to as a sliding window playlist since the playlist contains URLs for a limited portion of the presentation near the current playback time.

At each moment, the download manager downloads the highest possible rate chunk to provide the best video quality while trying to avoid buffer starvation (which corresponds to a video freeze).

The bandwidth for video delivery to wireless devices can be expensive as more and more users are downloading and watching videos on their wireless devices. Simultaneous downloads to multiple wireless users in a cell, WLAN hot spot, or in private networks will necessitate cell splitting or network reconfigurations to accommodate the demand. Live or scheduled (pay per view) broadcasts to many users are examples of video content downloading that is increasing the demand on the available bandwidth. The expense affects both the infrastructure equipment requirements and the quality of the presentation that the user perceives. HTTP Adaptive streaming solutions such as Apple's HTTP Live Streaming (HLS) and Microsoft's Smooth Streaming (MSSS) are designed to dynamically match the quality of the presentation to the available bandwidth thereby improving the viewing experience, but have limited impact on reducing the bandwidth demand.

For example, a key component of a Passive Optical Network (PON) based on ITU G.984 (GPON), is the Optical Line Terminal (OLT) node. The OLT can be seen as an optical bridge between the PON and an IP network, as shown in FIG. 1. A GPON may have several OLT nodes and each OLT allows several subscribers, in typical cases up to 1800 subscribers, to access the IP network. As shown in FIG. 1, each OLT has an input IP port and up to P=56 output PON ports. In typical architectures, the input port of the OLT has a maximum data throughput of $B_{0,max}$=6 Gbps and each output port of the OLT has a maximum data throughput of $B_{i,max}$=2.5 Gbps.

Consider now that, in the busy hour, a number "s" of devices per port are consuming a VOD or Live/Linear video streaming session, each requiring an average data throughput R. If all such devices use HTTP Live Streaming, such streaming sessions would be carried in TCP-based unicast streams and even if a Live/Linear content is being watched by many devices, each of them would be consuming R bits/s of capacity. Therefore, the number s of devices that can simultaneously receive a streaming session of R bits/s per port is given by:

$$s \leq \min\left(\frac{B_{i,max}}{R}, \frac{B_{0,max}}{P \cdot R}\right),$$

and considering $B_{0,max}$=6 Gbps, $B_{i,max}$=2.5 Gbps, P=56, R=6 Mbps (a high resolution video stream), it is easy to see that s must be equal or lower than 1000 and we see that the input port of the OLT is not able to support the capacity required if the PON has more than 1000 subscribers consuming a video streaming session during this busy hour. Note that, even if all s devices per port were all watching the same video streaming session, the OLT would not be able to support them if they access the video streaming session through HTTP Live Streaming (or any one of the other HTTP/TCP-based streaming protocols).

A common approach to alleviate bottlenecks in a network in which many devices are consuming the same content is to employ broadcast technologies, which are supported in an IP network by using multicast. There are many protocols in use today to support multicast transmissions in IP networks; namely the RTP and the UDP protocols.

The Real-time Transfer Protocol (RTP) is designed for end-to-end, real-time, transfer of multimedia data. RTP implementations are built on the User Datagram Protocol (UDP). RTP supports data transfer to multiple destinations through multicast. The ability to multicast to multiple users that are interested in live presentations can have a profound reduction on bandwidth demand since the presentations are sent once rather than multiple times. However, RTP/UDP is inherently unreliable since the protocol does not provide error recovery/retransmission mechanisms.

Another issue with multicast technologies is that, depending on the propagation conditions of individual users, a multicast transmission of a presentation may not allow all users with varying channel conditions to properly demodulate the received packets of data. No capability currently exists for multicast recipients to adapt to the wireless conditions.

Another problem is that HTTP Live Streaming servers do not employ multicast technologies; i.e., instead of using RTP and UDP, they use HTTP and TCP, which are inherently unicast technologies. Finally, while IP multicast can be supported in a Local Area Network (LAN), it may not be supported in a Wide Area Network (WAN). Therefore a need exists for a method and apparatus for distributing live video to multiple devices that reduces overall system bandwidth to users having differing bandwidth capabilities.

BRIEF DESCRIPTION OF THE DRAWINGS

FIG. 3 illustrates a typical HTTP Live Streaming variant playlist with optional multicast enablers.

DETAILED DESCRIPTION OF THE DRAWINGS

Figure 1:
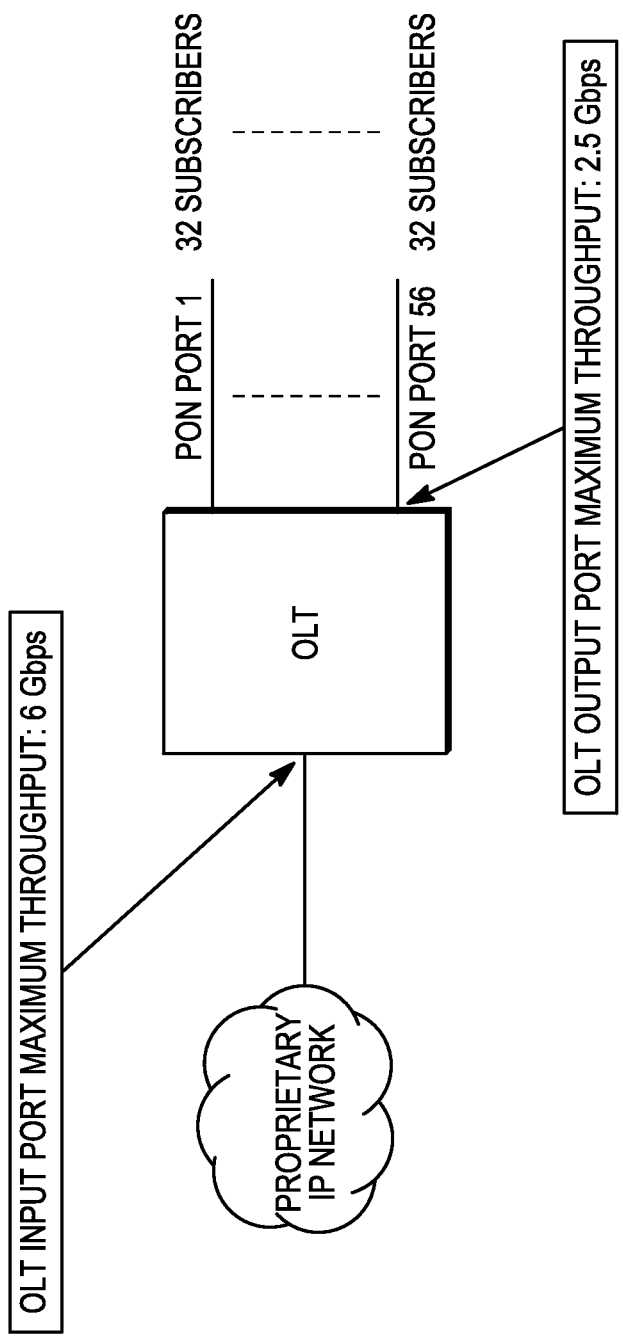
FIG. 1 is a block diagram showing an Optical Line Terminal (OLT) node existing as an optical bridge between the PON and an IP network.

In order to alleviate the above-mentioned need, a method and apparatus for distributing live video to multiple client devices is provided herein. In particular, a router is provided that acts on behalf of multiple client devices in its network. The router serves multiple groups of client devices, with each group being formed by client devices having similar bandwidth requirements. The router then requests and receives video chunks from a network. The router then redistributes the video chunks to the multiple client devices using a multicast transmission. In particular, to minimize the demands on the core network, the router sets up a separate multicast to each group of client devices. Live video, of the appropriate quality is then multicast to each group. The number of client devices in a group can be as small as one client device. The number of client devices in a group can also vary over time.

The present invention encompasses a method for operating a client device. The method comprises the steps of requesting a presentation playlist from a server, receiving the playlist from the server, and determining to receive the presentation by multicast based on the received playlist. The presentation may be received as either multicast or unicast. Channel conditions are determined. A request is sent to join a multicast group to receive the presentation based on the channel conditions.

The present invention encompasses a method for operating a client device. The method comprises the steps of receiving the presentation over a multicast transmission, determining that there were errors in the reception of the presentation, and in response to the determination that there were errors, setting up a simultaneous unicast connection to receive portions of the presentation that were received in error.

The present invention encompasses a method for providing a presentation to a plurality of devices. The method comprising the steps of receiving a presentation at a first quality over a first multicast connection, receiving the presentation at a second quality over a second multicast connection, and identifying chunk information for the received presentation. Based on the chunk information and the received presentation, chunks for the presentation are generated at the first and second qualities. A request is then received for a chunk of the presentation at the first quality from a first client. A request is then received for a chunk of the presentation at the second quality from a second client. Finally, the chunk is provided at the first quality to the first client and provided at the second quality to the second client.

The present invention additionally encompasses an apparatus comprising a transmitter requesting a presentation playlist from a server, a receiver receiving the playlist from the server, logic circuitry determining to receive the presentation by multicast based on the received playlist, wherein the presentation may be received as either multicast or unicast, the logic circuitry additionally determining channel conditions. The transmitter requests to join a multicast group to receive the presentation based on the channel conditions.

The present invention additionally encompasses an apparatus comprising a receiver receiving a presentation at a first quality over a first multicast connection and receiving the presentation at a second quality over a second multicast connection, logic circuitry identifying chunk information for the received presentation and based on the chunk information and the received presentation, generate chunks for the presentation at the first and second qualities, and a server receiving a request for a chunk of the presentation at the first quality from a first client and receiving a request for a chunk of the presentation at the second quality from a second client, the server then providing the chunk at the first quality to the first client and providing the chunk at the second quality to the second client.

The proposed solution maintains a degree of backwards compatibility with the existing HTTP adaptive streaming solutions that rely completely on TCP/IP for transporting playlists and video chunks upon request from the client devices. In the same fashion as the existing HTTP adaptive streaming solutions, a video stream is transcoded into multiple bit rates. The transcoded streams are then broken into chunks that are temporarily stored by the server and the sequence of chunks are cataloged with playlists. Video chunks can, for example, be created as MPEG-2 Transport Streams and stored as temporary files, or created/stored as fragmented mp4 files or as a byte range. The preferred embodiment described herein will be based upon the MPEG-2 Transport Stream (TS) specification. In any case, the existing HTTP adaptive streaming solutions and the proposed solution may use the same respective video chunks and playlists. However, this proposed solution is able to achieve a reduction in the bandwidth demands for live video streaming by transporting the video chunks with the combination of TCP/IP and RTP/UDP through the use of multicast groups. Multicast support for adaptive streaming is provided through an intelligent router called an Adaptive Multicast Gateway Router (AMGR). In a first embodiment, this AMGR is deployed in each Local Area Network (LAN) and serves as the designated router interface to the WAN, is elected among all routers in the LAN, and acts as a hub to reduce IP traffic between routers of the LAN. In a second embodiment, a single AMGR can be installed within the WAN infrastructure to serve multiple remote LANs.

In this solution, TCP is used for core network downloads from the server with the same HLS protocol used in existing adaptive streaming systems. However, instead of downloading video chunks directly to the client in a TCP/IP unicast transmission, the AMGR acts on behalf of multiple client devices in its LAN. The AMGR implements the HLS protocol with the server to request and receive video chunks from the core network over a TCP transport. It then redistributes the video chunks to the AMGR Clients using an RTP multicast transmission. Each group then receives its own multicast session. Note that, in this solution, instead of having multiple HLS client devices requesting chunks to the HLS server, a single HLS client (the AMGR) requests the chunks, minimizing the demands on the core network.

There are many ways to transmit RTP multicast. In the preferred embodiment, the AMGR manages a video multicast group for each transcoded video resolution, and a separate audio multicast group for the presentation. In another embodiment, the AMGR multicasts RTP packets with both video and audio.

Each video multicast group is referred to as a multicast gear. Each of these multicast gears is assigned a specific modulation and coding rate that the AMGR uses to transmit the video chunks associated with that multicast gear.

The AMGR Client initiates HTTP Live Streaming (HLS) with a request for the variant playlist using a TCP transport. In some contexts and embodiments, the AMGR Client may also used a TCP transport to request the simple playlists. From these playlists, the AMGR Client determines whether the content is live or not, and if it is live, the AMGR Client determines the gears available from the playlists. In one embodiment of this invention, the variant and simple playlists follow the HTTP Live Streaming standard without any additional information. In this embodiment, the AMGR Client determines that the session is live by inspecting any of the simple playlist. If the simple playlist does not contain the "#EXT-X-ENDLIST" tag, which is normally not present when a live presentation is starting, then the AMGR Client will decide that the session is live; otherwise, it decides that the session is not live (i.e., it is video-on-demand). In an alternate embodiment, new information is included in the variant playlist to indicate that the content is a live (or scheduled) video stream, as illustrated in FIG. 3.

In one embodiment, once the AMGR Client sees that the content is live, it can request support from the AMGR to deliver the live video. In another embodiment, once the AMGR Client sees that the content is live, it periodically communicates with the AMGR to verify whether it is providing support for delivering the live video through multicast. In a further embodiment, the AMGR periodically sends messages to the AMGR Clients, indicating that it is providing support to a particular live video through multicast.

RTP multicast is used by the AMGR for LAN distribution of video chunks to multiple recipients using adaptive streaming. The AMGR Client must initially estimate the available bandwidth of the channel based on the time to download the variant playlist and then join a multicast gear to retrieve video chunks based on its current bandwidth estimate. The AMGR is then responsible for multicasting video chunks to each multicast gear within the LAN at the assigned modulation and coding rate using the presentation resolution assigned to that multicast gear. For those receivers experiencing high quality, modulation schemes such as 16 QAM, 64 QAM or 256 QAM are utilized, while for those experiencing low quality, modulation schemes such as BPSK or QPSK are utilized. Multiple coding rates may be available for each modulation scheme to provide finer quality granularity, to enable a closer match between the quality and the transmitted signal characteristics. Such coding rates may include, but are not limited to 1/2, 1/3, 2/3, 3/4, or 7/8 AMGR Clients adapt to the appropriate multicast gear based on on-going bandwidth measurements of the multicast transmissions such that an appropriate modulation and encoding scheme is utilized by each gear.

In the event that the AMGR Client determines that an RTP packet has been received in error (or is missing altogether), the AMGR Client negotiates with the Adaptation Server using TCP to request a retransmission of the video chunk (or a portion of it; i.e. byte-ranging). These retransmission requests are normal HTTP Get requests used in the HLS protocol. TCP/IP is used to transport the retransmission in parallel to the ongoing video chunk downloads over RTP multicast.

Prior to describing a method and apparatus for distributing live video to multiple devices, the following text and equations are provided to set the necessary background for utilization of the preferred embodiment of the present invention.

AVMS—Adaptive Video Multicast System, which is the set of AMGR, AMGR Clients, AMGR Agents and associated software and protocols that form the present solution.

AMGR—Adaptive Multicast Gateway Router that streams live presentations to client devices.

presentation—refers to multimedia streams of data that are downloaded from a server to a client. Examples of presentations are: movies, video clips, music files, etc. In the case of a music file, the presentation contains a single stream of data (the digitized music); while in the case of a movie presentation, the presentation contains at least 2 streams of data: the video and the audio portions of the movie.

HTTP—Hypertext Transfer Protocol, which is the most used protocol for communication between clients and servers on the Internet.

HLS—HTTP Live Streaming, which is a client-controlled, HTTP and TCP-based protocol for presentation streaming.

HTTP Adaptive Streaming—A general term for any of the chunk-based adaptive streaming protocols/standards, such as HLS, Microsoft Smooth Streaming, Adobe HTTP Dynamic Streaming, MPEG DASH, 3GPP Adaptive HTTP Streaming, or others.

TCP—Transmission Control Protocol, which is the most used transport protocol for reliable communication between nodes in the Internet.

RTP—Real-time Transfer Protocol, a protocol designed for end-to-end, real-time, transfer of multimedia data. RTP implementations are built on the User Datagram Protocol (UDP). RTP supports data transfer to multiple destinations through multicast.

URI—Uniform Resource Identifier, which is a string that identifies a site or file (or, more generally, a resource) on the Internet.

URL—Uniform Resource Locator, which is a string that identifies a file on the Internet.

IGMP—Internet Group Management Protocol, which is a protocol used to enable multicast transmissions.

AMGR Clients—cell phones, laptop computers, notebook computers, . . . , etc. that utilize the services of the AMGR.

playlist—a text file that store the URIs for chunks of a presentation that belong to the same coding rate.

Sliding window playlist—a playlist that periodically changes as the live presentation progresses. If the presentation is finished and its last chunk has been produced and included in the sliding window playlist, the HLS protocol specifies that the "#EXT-X-END-LIST" tag be included in the playlist. Such tag indicates to the HLS client devices that there are not further chunks in the presentation.

variant playlist—a text file that identifies the URIs of individual sliding window playlists, one for each resolution and encoding rate.

Gear—A video multicast group is referred to as a multicast gear. The video multicast group has its own modulation and encoding rate, which may differ from modulation and encoding rates of different gears.

resolution—is used in a more general sense than the number of pixels on a screen. It is more generally related to the quality of the video, such as the video encoded bit rate, the "gear" being used to deliver the video, or other quality-related characteristics.

STB—Setup Box

AMGR Agent—a piece of software hosted in one of the network nodes that allows one or more HLS clients to receive multicast streams from the AMGR.

DRM—Digital Rights Management.

LAN—Local Area Network

PON—Passive Optical Network

GPON—Passive Optical Network based on ITU-T G.984 standard.

ONT—Optical Network Terminal, which is the client's interface to the PON.

OLT—Optical Line Terminal, which forms the bridge between the PON and the IP network.

Figure 2:
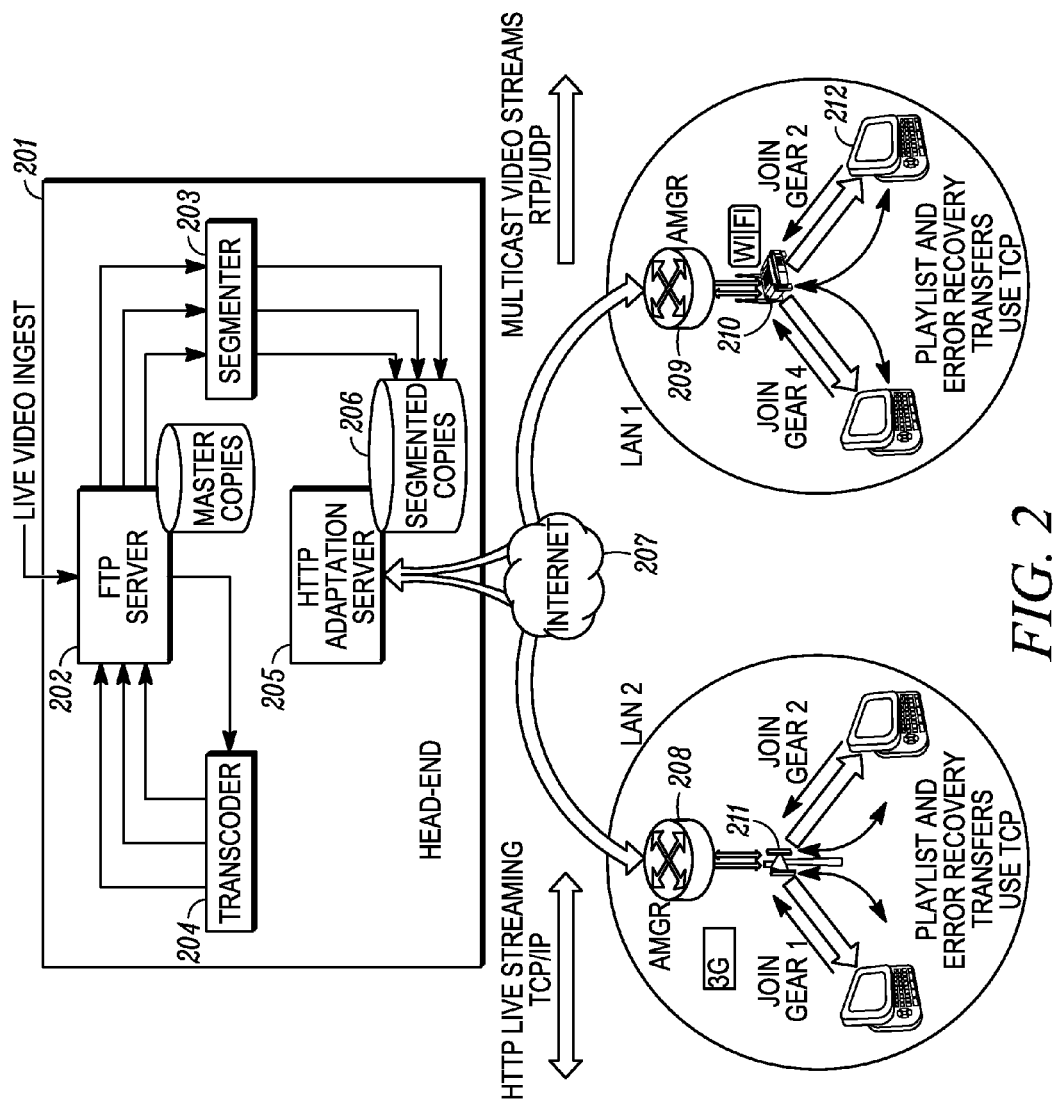
FIG. 2 illustrates a wireless system architecture that supports the proposed solution in a first embodiment.

BHR—Broadband Home Router (BHR), which is a specialized router that can communicate with the ONT FIG. 2 illustrates a wireless system architecture that supports the proposed solution in a first embodiment. As shown, the architecture of FIG. 2 includes head end 201, FTP server 202, segmentor 203, transcoder 204, adaptation server 205, database 206, network 207, AMGRs 208 and 209, base station 211, access point 210, and client devices 212 (only one labeled). In FIG. 2 a first embodiment is described which considers that all client devices 212 are AMGR Clients; i.e., they are able to communicate with the AMGR and extract content from the multicast gears. This embodiment can be implemented in various types of architectures; in here, we describe two system architectures in which the invention can be implemented.

In FIG. 2, video is ingested in FTP server 202 at head-end 201. FTP server 202 passes the live video stream to Transcoder 204 who encodes the stream into multiple streams of different bit rates/frame rates. FTP server 202 receives these multiple streams and passes them to Segmentor 203 that breaks the video into multiple chunks with a common length (e.g. approximately 4 seconds). The segmented chunks are temporarily stored locally in database 206 for access by Adaptation Server 205.

Adaptation server 205 is a portal for adaptive streaming requests. Adaptation server 205 manages a variant playlist and a set of sliding window playlists for each of video resolution provided. The variant playlist describes the video resolutions or gears available for adaption and a URI that points to the sliding window playlist for each gear. Optionally, when adaptation server 205 is enabled, the variant playlist will also provide a Content Type to indicate that the content is "Live" video, as shown in FIG. 3

Figure 4:
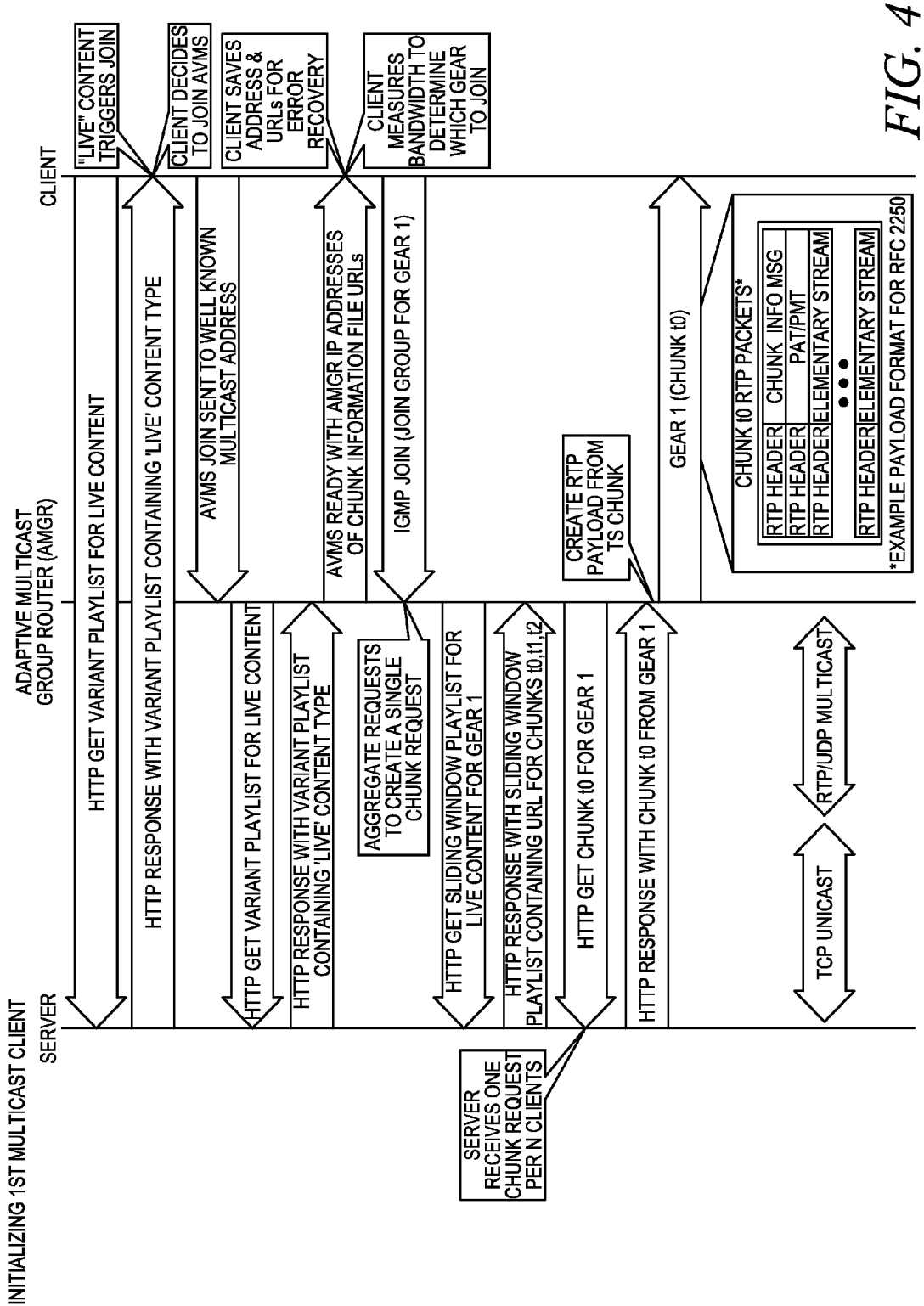
FIG. 4 is a session flow diagram for the system architecture of FIG. 2.

FIG. 4 illustrates the message flow of the steps to initialize the system architecture shown in FIG. 2. As shown in FIG. 4, an AMGR Client device (using an HTTP Get request and the TCP/IP transport protocol) requests the variant playlist. In response, adaptation server 205 returns the variant playlist to AMGR Client 212. When AMGR Client 212 parses the variant playlist and observes that the video content is "Live" video, AMGR Client 212 can request the service of an AMGR to deliver the video chunks using the RTP/UDP transport protocol. If the variant playlist does not contain the "Live" video indication, AMGR Client 212 can alternatively determine that the video content is live by downloading the simple playlists and verifying whether they contain the "#EXT-X-ENDLIST" tag. During the parsing of the variant playlist, the AMGR Client 212 also determines which gears are available.

The request for multicast service (e.g. AVMS JOIN) is sent as a unique message from client 212 to its AMGR using TCP/IP and is sent only if the client supports multicast reception of the video chunks. The message is sent to a well-known multicast address that is handled by designated routers of an AVMS, such as the AMGR. The AMGR then requests the variant playlist to learn of the number of multicast gears that it will support. With this information, the AMGR can prepare an AVMS Ready message response. This response is sent to AMGR Client 212 (again using TCP/IP as the transport). This exchange of messages with the AMGR provides AMGR Client 212 with knowledge that there is an AVMS and that it can expect to receive video chunks as multicast RTP payloads. The AVMS Ready message response also contain the IP address of the multicast groups corresponding to each of the available gears identified in the variant playlist. The AVMS Ready message also includes URLs within the AMGR that contain information to be used for error recovery (to be discussed later).

After a timeout period (e.g. equivalent to half a chunk duration), the absence of an AVMS Ready response will signal AMGR Client 212 that AVMS is not supported at this time and that it should use the standard HLS protocol to retrieve video chunks directly from adaptation server 205 using TCP/IP as the transport protocol. Alternatively, the AMGR could send an AVMS Not Ready message to signal AMGR Client 212 to use the standard HLS protocol. This could also be a mechanism to control the use of AVMS whereby the AMGR could switch from unicast transmissions to multicast transmissions when there is critical mass interested in "Live" content.

RTP (as defined in IETF RFC 3550) provides end-to-end network transport functions suitable for applications transmitting real-time data, functions such as time stamping for syncing audio and video, delivery monitoring, and sequence numbering for play-out in proper order and identification of missing packets. RTP is regarded as the primary standard for audio/video transport in IP networks and is used with an associated profile and payload format. One common profile for HTTP adaptive streaming uses H.264 AVC video and AAC audio codecs. Several payload formats are possible for transporting H.264 AVC video and AAC audio, but payload formats defined in IETF RFCs 2250 and 3394 are best suited for this proposed solution. Proprietary solutions that use variants of these RFCs are also possible.

RFC 2250 specifies the RTP payload format for MPEG-2 transport stream (TS). The MPEG-2 TS specification is defined in 3 parts: System, Video, and Audio. The System part allows encapsulation of video and audio in several formats (including H264 AVC and AAC audio). When using RFC 2250 payload format to encapsulate the System Part of MPEG-2 TS, the AMGR must compose RTP packets with an integral number of TS packets (including TS header). These RTP packets will contain program specific information sections (such as the Program Association Table (PAT) or the Program Map Table (PMT)) or Packetized Elementary Stream (PES) packets. This payload profile will be assumed in this specification.

As an alternative, RFC 3384 specifies the RTP payload format for H.264 AVC. Three packetization modes are specified; single Network Abstraction Layer (NAL) unit mode, non-interleaved mode, and interleaved mode. The single NAL unit mode and the non-interleaved mode are best suited for an AVMS. RFC 3384 enables fragmentation of one NAL unit into multiple RTP packets and supports encapsulating a single NAL unit, more than one NAL unit, or a fragment of a NAL unit into one RTP packet. When using the RFC 3984 payload profile, the AMGR composes RTP packets with single NAL Unit packets or single-time aggregated NAL Unit packets. This payload profile reduces load on client and reduces overhead associated with PAT, PMT, and PES, but requires the use of RFC 2250 profile for encapsulating the AAC audio stream.

Consider two types of transport using RTP:
  Standard RTP transport, as defined in IETF RFC 3550: in this method, video and audio are transported in separate RTP multicast streams. In this method, the AMGR performs the following activities:
    Receives a chunk file from a standard HLS server (via HTTP GET);
    Splits the chunk into separate audio and video streams;
    Maps the audio and video streams onto separate RTP connections;
    Inserts markers that label the first and last RTP packets for the current chunk;
Still in this method, AMGR Client 212 performs the following activities:
  Receives the RTP packets;
  Identifies range of RTP packets corresponding to the chunk;
  If necessary, re-interleaves the audio and video streams into a TS stream for the chunk; and stores the reconstructed chunk file.
Proprietary "file transfer" over RTP transport: in this method, video and audio are transported within a single file, streamed in a single RTP multicast stream. In this method, the AMGR performs the following activities:
  Receives a chunk file from a standard HLS server (via HTTP GET)
  Maps the bytes of the chunk file directly into a single RTP stream (multiple RTP packets) using a special payload type;
  Inserts markers that label the first and last RTP packet for the current chunk
Still in this method, AMGR Client 212 performs the following activities:
  Concatenates the RTP payloads to reconstruct the original chunk file.

Continuing with FIG. 4, AMGR Client 212 is responsible for estimating the bandwidth of the channel. In the adaptive streaming solution of the prior art, it is necessary for the client to estimate the bandwidth of the wireless channel to determine which sliding window playlist should be used to select the next chunk to download. When getting variant playlist, the client estimates bandwidth of the channel that supports the TCP unicast route. An estimate can be made based upon the download of the variant playlist, although this estimate may not be accurate. For that reason, the initial sliding window playlist is often defaulted to the lowest bandwidth gear. In the proposed solution, AMGR Client 212 uses this bandwidth estimate to make a Join request to the AMGR for a multicast gear group that corresponds to the bandwidth estimate. Again, the initial gear selection may be defaulted to correspond to an assumed bandwidth. Implicit in FIG. 4, if using the standard RTP transport, the Join Request shown includes a separate Join Request for the audio multicast group associated with this presentation. A Join request is part of the IGMP protocol that is supported by IP multicast capable routers such as the AMGR. The AMGR Client broadcasts the Join Request for a specific multicast gear to the AMGR. If there are multiple routers in the LAN, this request is forwarded by the intermediate routers uplink to the designated router for this LAN, which by definition is the AMGR.

Once the AMGR receives the first Join Request for a particular multicast gear, it must request a sliding window playlist for that gear from Adaptation Server 205. This is done with a HTTP Get as shown in FIG. 4. Once the sliding window playlist is received from Adaptation Server 205, the AMGR then requests the next video chunk from the Live video stream. It is the responsibility of the AMGR to group requests from AMGR Clients for a particular multicast gear, thus avoiding the download of multiple copies of the sliding window playlists and video chunks. In other words, one copy of the sliding window playlist and video chunks for a particular gear will be downloaded to be multicast to all client devices that requested the particular gear.

As presentation chunks are received by the AMGR from Adaptation Server 205, the AMGR must begin multicasting the presentation. This requires the AMGR to parse the MPEG-2 Transport Stream (TS) video presentation chunk files into RTP packets and address them to the appropriate multicast group. Assuming use of RFC 2250 for RTP packet encapsulation, each presentation chunk contains a mix of Program Specific Information (PSI) sections and Packetized Elementary Streams (PES) that span one or more Transport Stream packets and are parsed from the TS file chunks by the AMGR. Each PSI section can then be independently encapsulated into an RTP packet using the RFC 2250 payload format for the system part of MPEG-2 or they can be combined. For each program id (PID) and Presentation Time Stamp (PTS), a PES is encapsulated in an RTP packet using the RFC 2250 payload format for the system parts of MPEG-2. This implies that audio and video PES sections are encapsulated into different RTP packets.

One role of the AMGR is to create a file per multicast gear that contains a Chunk Information message. A URL for these Chunk Information files is provided in the AVMS Ready message discussed earlier. The Chunk Information message is sent to the AMGR Client at the start of each chunk. The Chunk Information message contains the URL within the AMGR of the MPEG-2 TS chunk file that is ready to be downloaded through a multicast transmission. The Chunk Information message also contains the number of RTP packets to be transmitted in the current chunk. Other information such as the RTP packet sequence numbers for a chunk, metadata for decoding streams (e.g. metadata boxes of an ISO Media File), file sizes for the current (and possibly future) chunks, and DRM decoding keys for the chunk could also be included. Prior to multicasting a new chunk of the presentation to each of the multicast gears, the AMGR will multicast an RTP packet containing the Chunk Information message. This Chunk Information message is multicast to each multicast gear group (including the multicast group for audio). If the multicast RTP packet with the Chunk Information message is lost in the UDP transmission, the AMGR Client device can retrieve the Chunk Information File by transmitting an HTTP GET message to the AMGR. Note that the AMGR Client device can determine if and when all the RTP packets of a previous chunk have been received because the information regarding the number of RTP packets and the sequence number of the first RTP packet in the chunk were provided in the previous Chunk Information message. This will be discussed below.

The Chunk Information file is updated after the last RTP packet of a chunk has been transmitted and prior to the start of the next chunk. In this way, if an AMGR Client wants to retrieve the information about the current chunk being downloaded, it can refer to the Chunk Information message that it received as the first RTP packet of the chunk. In the event that the Chunk Information message was not received, the Chunk Information URL for the appropriate multicast gear that was received in the AVMS Ready message can be used to access the Chunk Information file that contains the desired information.

Another role that the AMGR may serve is support for DRM for a presentation. The prior art solution provides a URL in the sliding window playlist for DRM decoding keys for the presentation. The sliding window playlist is encrypted and the AMGR Client must decrypt the playlist to obtain the URL for the presentation decoding keys. The AMGR Client must obtain a key to decrypt the sliding window playlist from a trusted source. Using this same mechanism for the proposed AVMS, the AMGR is required to obtain the necessary key from a trusted source to decode the sliding window playlist so that the DRM decoding key URL can be extracted. The AMGR will then be responsible for inserting the DRM decoding key URL in the Chunk Information message and encrypting the Chunk Information message with the same key it used to decrypt the sliding window playlist. Then, as in the prior art, the AMGR Client must obtain the same decryption key to decrypt the AVMS Ready message. It is possible that the DRM decoding keys may change periodically. In the event that the sliding window playlist provides a new URL for the DRM decoding keys, then the AMGR will send the new URL in the next Chunk Information message. This implies that when DRM is active, the Chunk Information message is always encrypted. If the AMGR does not provide this role, each AMGR Client can also independently request this information from the Adaptation Server by periodically performing an HTTP Get for the sliding window playlist.

Multicast packets are provided to the AMGR clients through base station 211 or wireless access point 210. Once an AMGR Client begins to receive multicast packets from a particular multicast gear (or the multicast group for audio), it must await reception of the Chunk Information message. All other packets received before the Chunk Information message are discarded. The playback of a chunk of the presentation cannot begin until the corresponding Chunk Information message is successfully received, however missing Chunk Information messages can be tolerated later in the presentation with the appropriate error recovery mechanism discussed later.

The Chunk Information message provides an indication to the AMGR Client that a new presentation chunk is starting and that subsequent packets can be parsed and sent to the decoder for playback. Parsing requires the AMGR Client to construct Access Units from the RTP payload. In the preferred embodiment, the RTP payload format is specified in RFC 2250. Consequently, the parsing extracts NAL units from the MPEG-2 TS PES packets and combines all NAL units with the same Presentation Time Stamp (PTS) into a common access unit. The access units can then be passed to the decoder. In the same way, the AMGR Client parses the MPEG-2 PES packets for audio frames from the RTP payload and passes the audio frames associated with each PTS to the decoder as well.

In an alternate embodiment, the RTP payload format is specified in RFC 3384. In this case, the AMGR has already performed the parsing of the NAL units from the MPEG-2 TS PES packets, so the AMGR Client must combine the appropriate NAL units into an access unit that can then be passed to the decoder. For audio, the AMGR must parse the MPEG-2 TS PES packets and encapsulate the audio frames as specified in RFC 2250. Consequently, the AMGR Client parses the MPEG-2 PES packets for audio frames from the RTP payload (as specified in RFC 2250) and passes the audio frames associated with each PTS to the decoder as well.

In an alternate embodiment, the RTP payload could encapsulate a new container for an entire presentation chunk or select portions of the chunk. For example, the content of the new container could be similar to an MPEG-2 TS file.

In summary, FIG. 4 shows that Adaptation Server 205 has received a request from a multicast capable client for a presentation. The client has asked the AMGR in the system to retrieve the "Live" presentation from the Adaptation Server and to multicast the presentation to it at the gear resolution chosen based on a bandwidth estimate it made. The AMGR Client then receives the multicast RTP packets from the chosen multicast gear and parses them and passes the parsed access units to its decoder (not shown in FIG. 2). Note that the AMGR may be multicasting presentation packets to several multicast gear groups (as well as a specific multicast group for audio) depending the Join Requests received from other possible AMGR Clients.

Since the multicast of presentation chunks are potentially free running provided that the AMGR Client does not need to change gears to adapt to changing bandwidth conditions, it is necessary for the AMGR to periodically send an IMGP Query on each active multicast gear group. The AMGR Clients must then respond to the Query with a Membership Report so that the AMGR knows whether any AMGR Client is still interested in the presentation for a particular multicast gear group. The AMGR may then decide to stop multicasting the presentation to a multicast group if no AMGR Client reports membership on that group. This is typical of the standard Internet Group Management Protocol (IGMP) protocol.

Going forward, the AMGR Client adapts to appropriate multicast gear group based on subsequent bandwidth measurements from the multicast presentation chunks that it receives from its RTP connection. While it is not mandatory, the bandwidth estimation can be aided by the size of the file being downloaded. The file size information of future presentation chunks can be made available by the AMGR through the Chunk Information message. The AMGR Client can then decide whether or not to change gears based on this advanced information (i.e. by determining whether there is time to download the next chunk based on the current bandwidth estimate). As an optimization, it is possible for a AMGR Client to join all, a subset, or adjacent gear groups to listen to other Chunk Information messages for file size information as well as to hasten the switch between gears.

Each time a presentation chunk is to be downloaded, the bandwidth measurements performed during the previous chunk download are used to determine whether or not to change to a different multicast gear group to ensure that the best possible video resolution is delivered to the AMGR Client.

Figure 5:
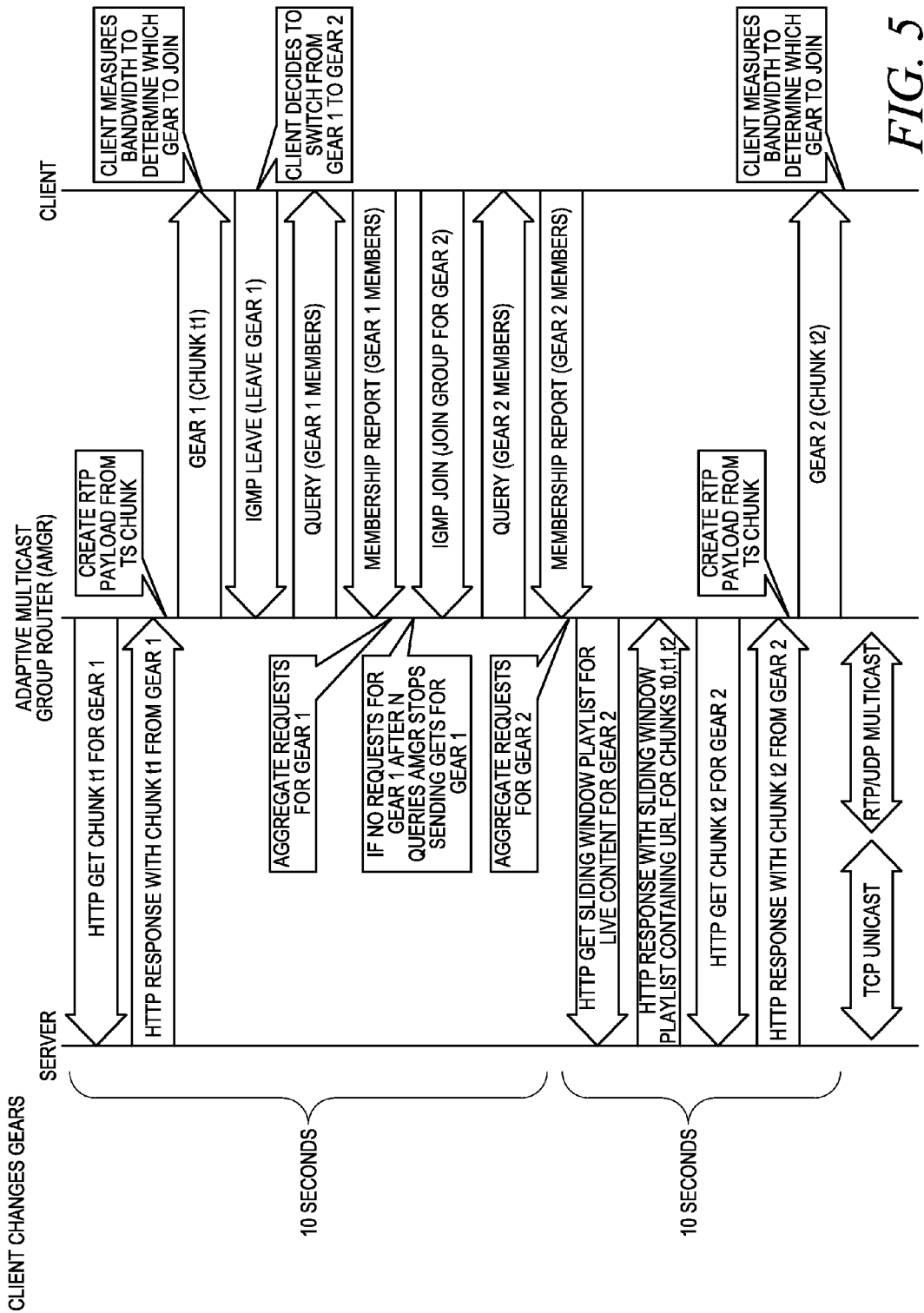
FIG. 5 illustrates the procedure used in changing gears.

FIG. 5 illustrates the procedure used in changing gears. The AMGR may receive an IGMP LEAVE message from the AMGR Client that is choosing to change gears. This enables the AMGR to send a Query to determine if there are other AMGR Clients still interested in receiving the presentation at the resolution that was being received by the AMGR Client that is changing gears. If another AMGR Client responds, the AMGR will continue to multicast the presentation at that resolution. When a AMGR Client wants to change gears, it must send an IGMP JOIN for the desired multicast group. As previously, the AMGR will group all client devices for multicasting, such that sliding window playlists and individual chunks from the newly requested gear are only sent once for all AMGR Clients within the AMGR's LAN.

GPON Architecture

In a GPON architecture, a key component is the Optical Line Terminal (OLT) node, which can be seen as an optical bridge between the PON and the IP network. A GPON may have several OLT nodes and each OLT allows several subscribers, in typical cases up to 1800 subscribers, to access the IP network. Each OLT has an input IP port and up to P=56 output PON ports. Generally, the OLT connects to the IP network through a Gateway Router (GWR) and the OLT's input port is the bottleneck.

Figure 6:
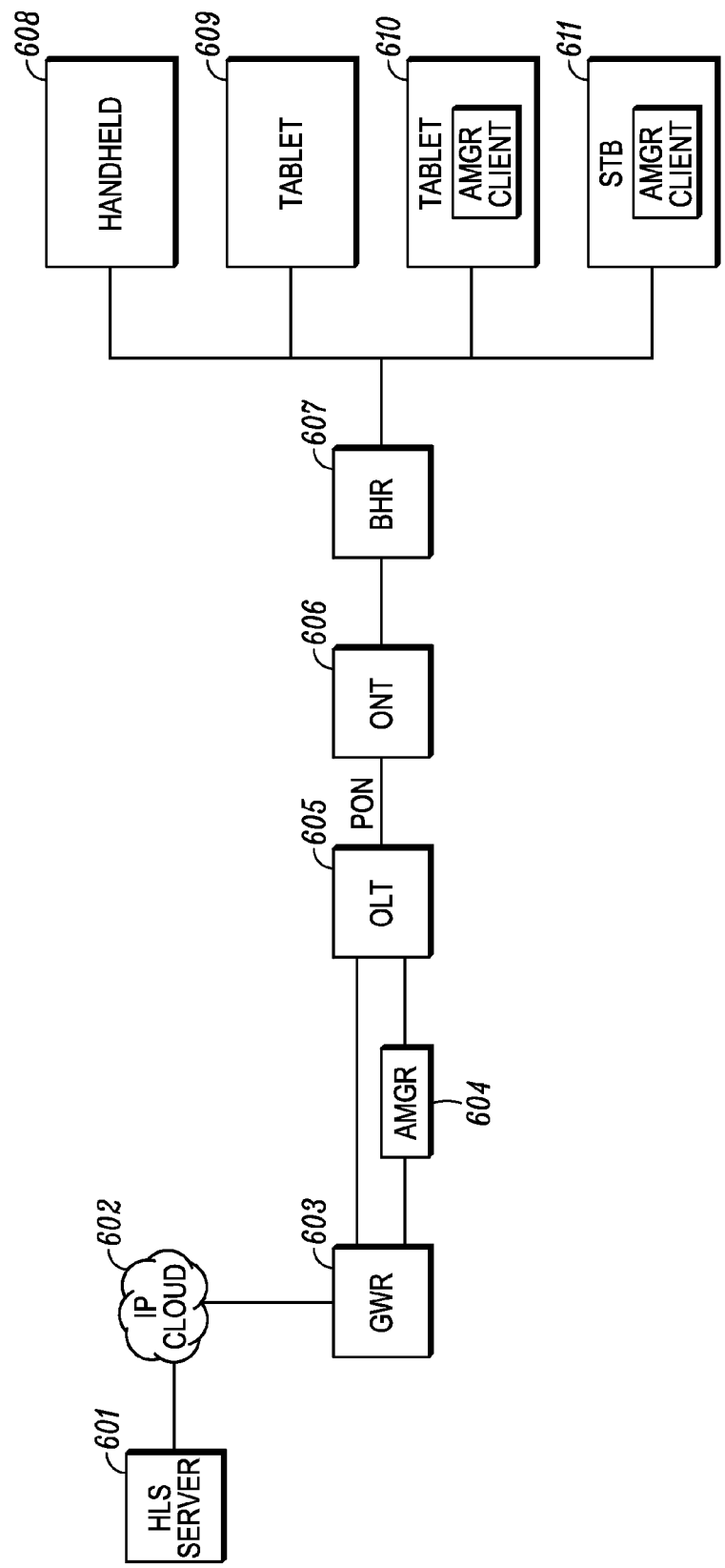
FIG. 6 is a block diagram of a GPON network.

FIG. 6 illustrates how the invention is applied to the GPON network. As shown in FIG. 6, the GPON network may have client devices Table 610 and Setup Box (STB) 611 that are equipped with the AMGR Client and may have client devices 608 and 609 that are not equipped with the AMGR Client, but are equipped with the HTTP Live Streaming client (HLS Client). These devices access the IP network through the BHR 607 (Broadband Home Router), the ONT 606 (Optical Network Terminal), the PON, the OLT 605 (Optical Line Terminal), and the GWR 603 (Gateway Router). The BHR 607, ONT 606, OLT 605, and GWR 603 form the end-to-end optical bridge that allows the customer's Local Area Network (LAN) be connected to the IP cloud 602. The GWR 603 and the BHR 607 are specialized routers that communicate with the optical nodes OLT 605 and ONT 606 of the GPON network. This figure shows that, in this architecture, the AMGR 604 is placed immediately before the OLT 605.

Regarding clients that are not AMGR Clients (handheld computer 608 and tablet 609), they are not capable of communicating with the AMGR 604 and are not capable of extracting content form the various multicast streams transmitted by the AMGR 604. These clients may operate as HLS Clients to consume HLS video content; however, in this embodiment, they do so without using the present invention. In other words, any HTTP Get request from a HLS Client within a non-AMGR Client passes through the OLT 605 and the GWR 603, bypasses the AMGR 604 and is directed to the HLS Server 601. HLS Server 601 responses are also directed to the OLT 605 and bypass the AMGR 604 as if it were not present.

Messaging Between the AMGR and the AMGR Client

We described above how existing IGMP messages could be used to set up, join, or tear down multicast sessions. Moreover, some new messages were introduced outside of IGMP that are specific to the proposed AVMS solution: namely, AVS Join and AVMS Ready. These new messages can be carried over a TCP connection between the AMGR and the AMGR Client. There are some additional messages that can be defined in order to further optimize the performance of the system:

- AVMS Mode: This message would typically originate from the AMGR, and would instruct an AMGR Client to switch the streaming mode in real-time (possibly in the middle of a presentation) to multicast or unicast. For example, the first AMGR Client to request a particular program may be instructed to use unicast (either through the AVMS Mode message, or as part of another initialization message). Then as more AMGR Clients join the program, the AMGR may determine that it would be more efficient to switch to multicast mode, and an AVMS Mode message would be sent to the AMGR Clients with an instruction to switch to multicast mode.
- AVMS Discovery: A AMGR Client could send this message as a way to inquire whether there is an AVMS capable router present. If so, the router would respond that it is AVMS capable, and may also include some initialization information in the response. The main benefit of this message is that the AMGR Client will know not to waste time sending an AVMS Join message (and waiting for a response timeout) when an AVMS-capable router is not present. Since the AVMS Join is sent after the playlist is requested, waiting for the response timeout could introduce significant additional delay in the live video stream.

This solution can support HLS clients that are not equipped with software to communicate with the AMGR and extract the content from the various multicast streams from the AMGR. This is enabled by the AMGR Agent (shown in FIG. 7). The AMGR Agent incorporates the functionalities of the AMGR Client and serves as the interface between the AMGR and non-AMGR clients. The AMGR Agent allows the benefit of this invention to be extended to non-AMGR clients as well.

There are 2 possible architectures for the AMGR Agent. Both architectures can be implemented in parallel with the techniques described above; i.e., AMGR Clients can operate with the AMGR without having to pass through the AMGR Agent.

In both architectures, the AMGR Agent is located closer to the edge of the network. For example, in a GPON architecture, the AMGR Agent is located within one of the nodes of the customer's LAN. In both architectures, the HLS Client is not aware of the existence of the AMGR Agent. The only change required in the HLS Client is the proxy configuration; i.e., HLS Clients are configured to use the AMGR Agent as a web proxy for HTTP calls.

AMGR Agent with Built-in HLS Server

In this architecture, the AMGR Agent has the following functionalities incorporated:
 AMGR Client;
 Web proxy; and
 Built-in HLS Server.

In this architecture, the content is delivered to legacy HLS Clients as follows:
1. The AMGR Agent receives chunks from the subscribed resolutions (through multicast)
2. AMGR Agent rebuilds TS chunks and store them in a local HLS server
3. AMGR Agent builds playlists according to the chunks that are available in the local HLS server.
4. HLS Clients download chunks from the HLS Server within the AMGR Agent.

Figure 7:
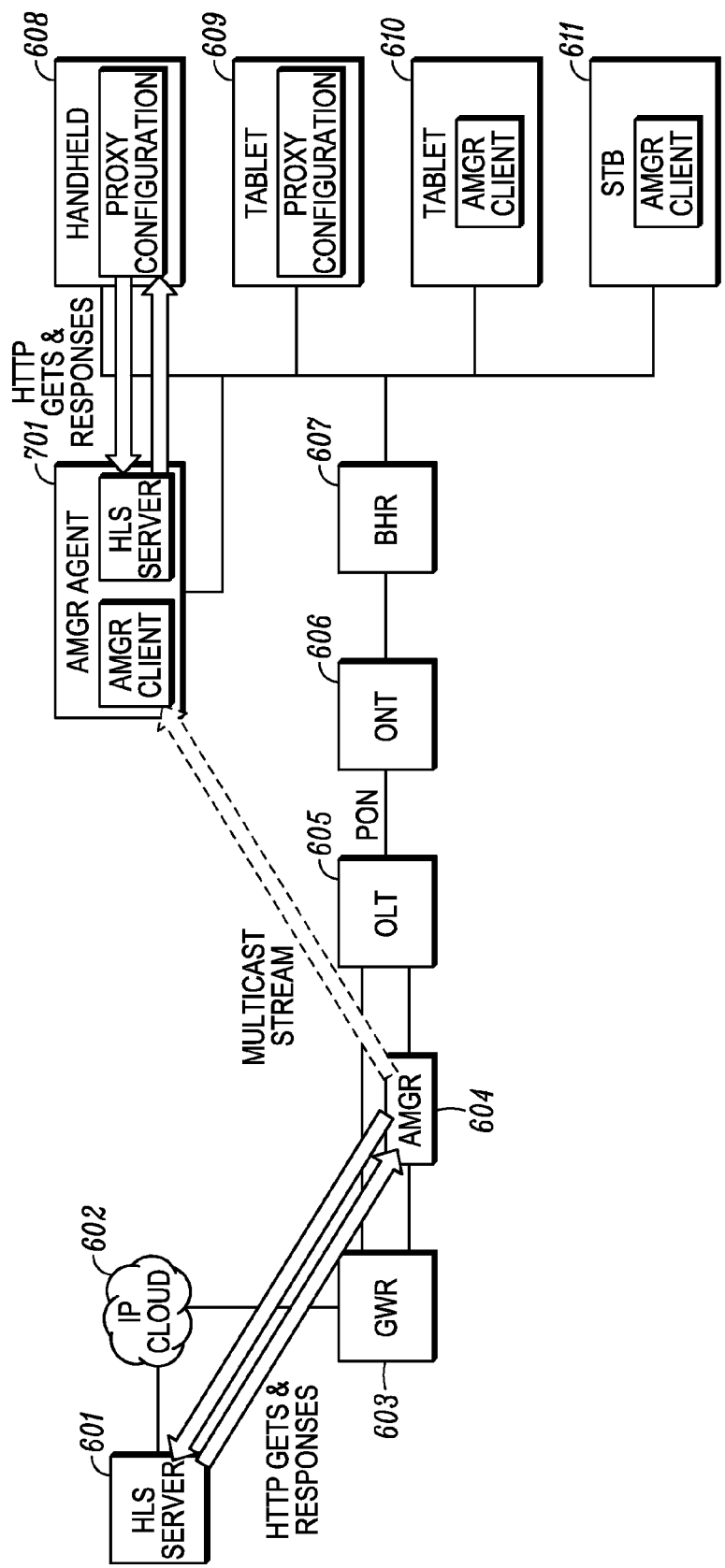
FIG. 7 is a block diagram of a GPON network.
Figure 8:
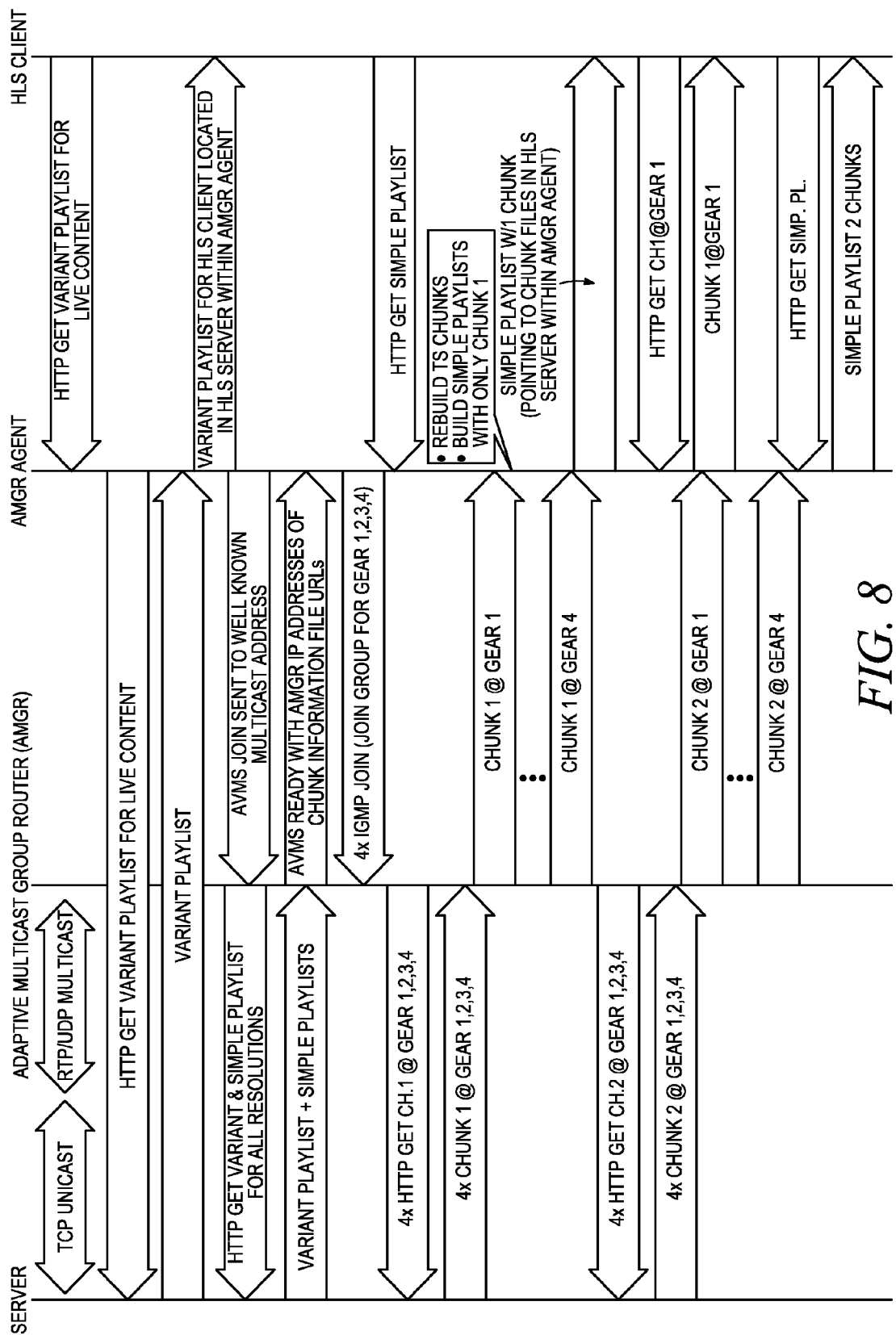
FIG. 8 illustrates the message flow between in the GPON network of FIG. 7.

FIG. 7 illustrates how this architecture is applied to the GPON network while FIG. 8 illustrates the message flow between HLS Clients, AMGR Clients, AMGR, and the HLS Server.

The key role of AMGR Agent 701 in this architecture is to build the file system that forms an HLS Server to allow the HLS Clients within the LAN to access the content. In other words, AMGR Agent 701 builds an HLS Server within itself, and the HLS Clients obtain their content from such built-in HLS Server.

The HLS Server built-in within AMGR Agent 701 is initiated with the variant playlist. The AMGR Agent issues the HTTP Get for the variant playlist to the HLS Server and, when the variant playlist file is received, it stores in its internal file system, allowing any HLS Client to request and download such file directly from AMGR Agent 701. Note in FIG. 8 that the first HTTP Get for the variant playlist triggers the HTTP Get from AMGR Agent 701 to the HLS Server. It also triggers the "AVMS Join" sent to the AMGR.

In the example shown in FIG. 8, AMGR Agent 701 issues the AVMS Join to all available gears. This causes the AMGR to start multicasting all resolutions in multiple multicast groups to which AMGR Agent 701 subscribed.

As the chunks arrive in the multicast stream, AMGR Agent 701 rebuilds the TS chunks, stores them in the file system, and updates the simple playlists.

Preferably, AMGR Agent 701 subscribes to a single resolution, as described above, however, AMGR Agent 701 may also subscribe to multiple or all resolutions available. This should expedite the construction of the database that is made available to the HLS Clients through the built-in HLS Server.

The AMGR Agent can be located in either a separate or in any of the existing computers within the LAN served by the BHR. The AMGR Agent can even be implemented within an Application that operates in parallel with the HLS Client; e.g. within a Handheld or Tablet device. In this case, the Handheld/Tablet Client Device is configured to be a proxy to itself.

Figure 9:
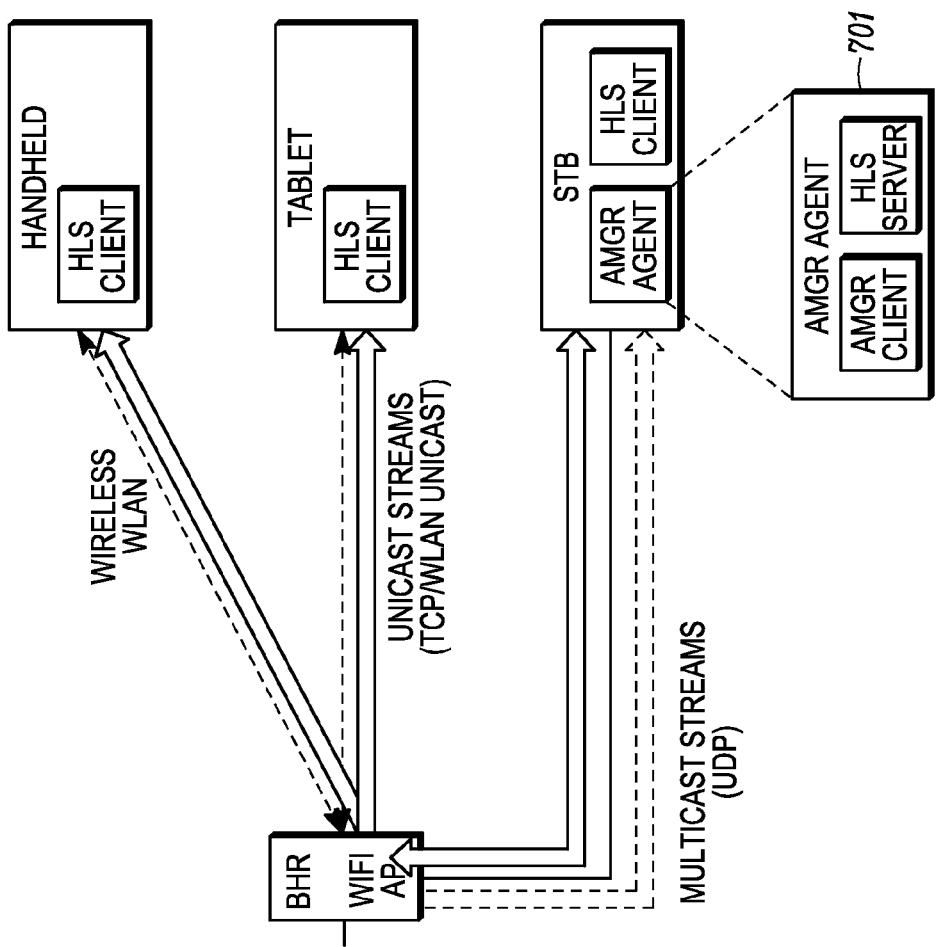
FIG. 9 illustrates the configuration in which an AMGR Agent is located within a set-top box.

In a GPON network illustrated in FIG. 7, AMGR Agent 701 is located in a stand-alone network computer; however, it can be located either within the Setup Box (STB) 611 or in any other computer within the customer premises. FIG. 9 illustrates the configuration in which AMGR Agent 701 is located within the STB and illustrates how the video chunks are accessed within the LAN through WiFi links. In this case, since the STB typically has a high bandwidth wired connection to the BHR, enough data throughput is available for one or more multicast groups to be received by the AMGR Client within AMGR Agent 701. HLS traffic (requests and responses) are restricted to the customers' local WiFi network.

AMGR Agent with Caching Functionality

In this architecture, the AMGR Agent has the following functionalities incorporated:
 AMGR Client;
 Web proxy; and
 Caching Server.

In this architecture, the content is delivered to legacy HLS Clients as follows:
1. The AMGR Agent attempts to respond to chunk HTTP GETs from HLS Clients;
2. If the AMGR Agent has the chunk stored in its caching server (or will shortly receive the chunk in the multicast stream), then it responds to the HLS Client with the file (i.e., no HTTP Get is issued to the HLS Server)

3. If the AMGR Agent does not have the chunk or will not have time to receive the chunk (e.g., the AMGR Agent is joined in a different multicast gear), then it issues an HTTP GET for the chunk (and once received, it forwards to the HLS client.)

In this architecture, the AMGR Agent tries to receive chunks to respond to HLS Client request from either a direct HTTP Get or through the AMGR multicast streams if available. In other words, both unicast and multicast streaming can be occurring in parallel in this architecture.

This architecture allows the AMGR to dynamically start and stop to multicast a particular video streaming session based on an algorithm within the AMGR. There are many possible algorithms that can be used. One of them works as follows: if the number of subscribers consuming a particular streaming session increases above a pre-defined or adaptive threshold, then the AMGR starts streaming the live video session; if such number falls below another pre-defined or adaptive threshold, then the AMGR stops streaming the live video session.

Figure 10:
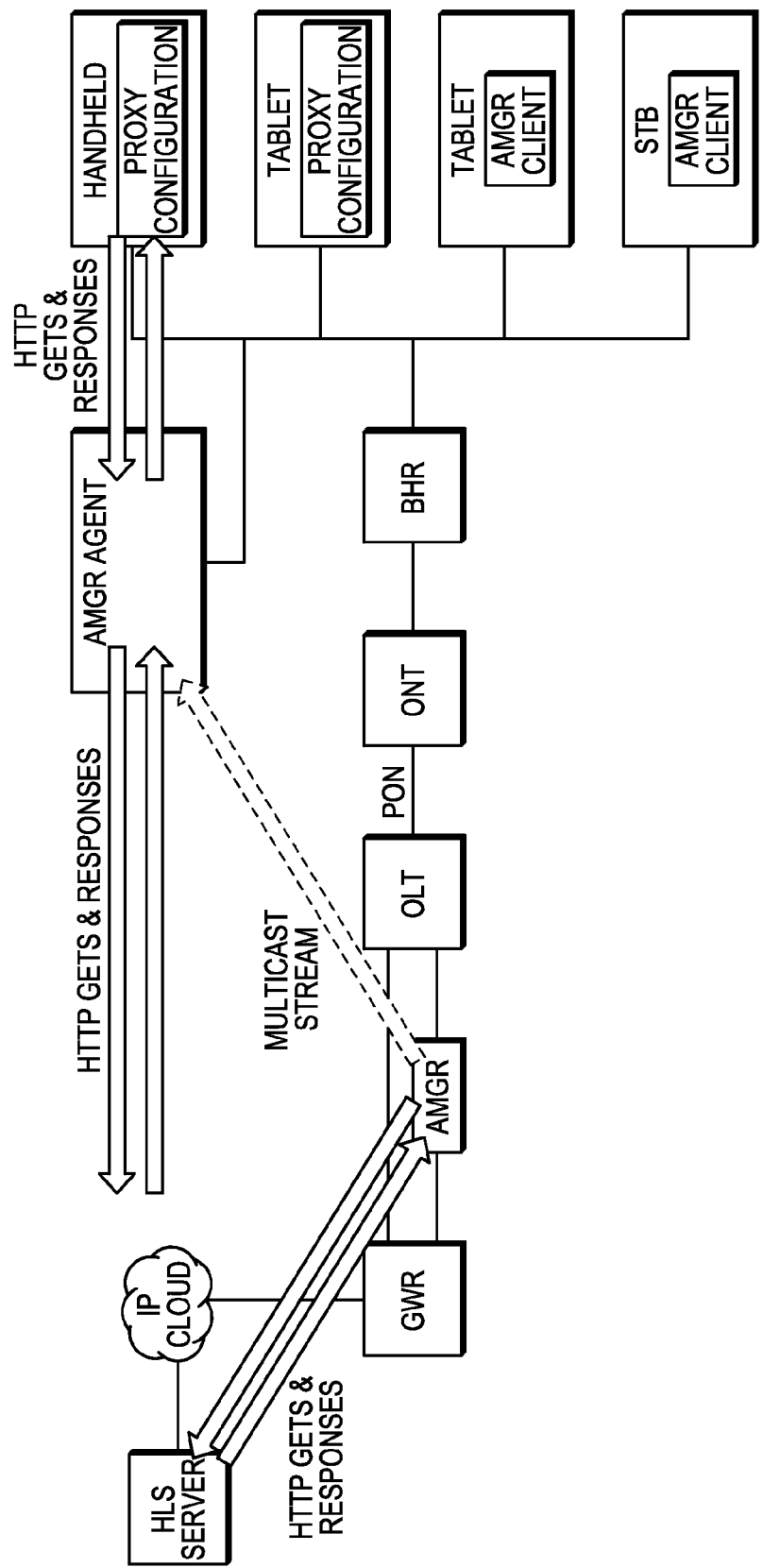
FIG. 10 illustrates an AMGR agent that may start and stop streaming based on a threshold.

Since the AMGR may or may not be streaming a particular live video session, the AMGR Agents would periodically communicate with the AMGR to determine whether it is streaming multicast streams of the particular live video session. FIG. 10 illustrates this architecture.

As in the architecture described above, the AMGR Agent can be located in either a separate or in any of the existing computers within the LAN served by the BHR. The AMGR Agent can also be implemented within an Application that operates in parallel with the HLS Client; e.g. within a Handheld or Tablet device. In this case, the Handheld/Tablet Client Device is again configured to be a proxy to itself.

Figure 11:
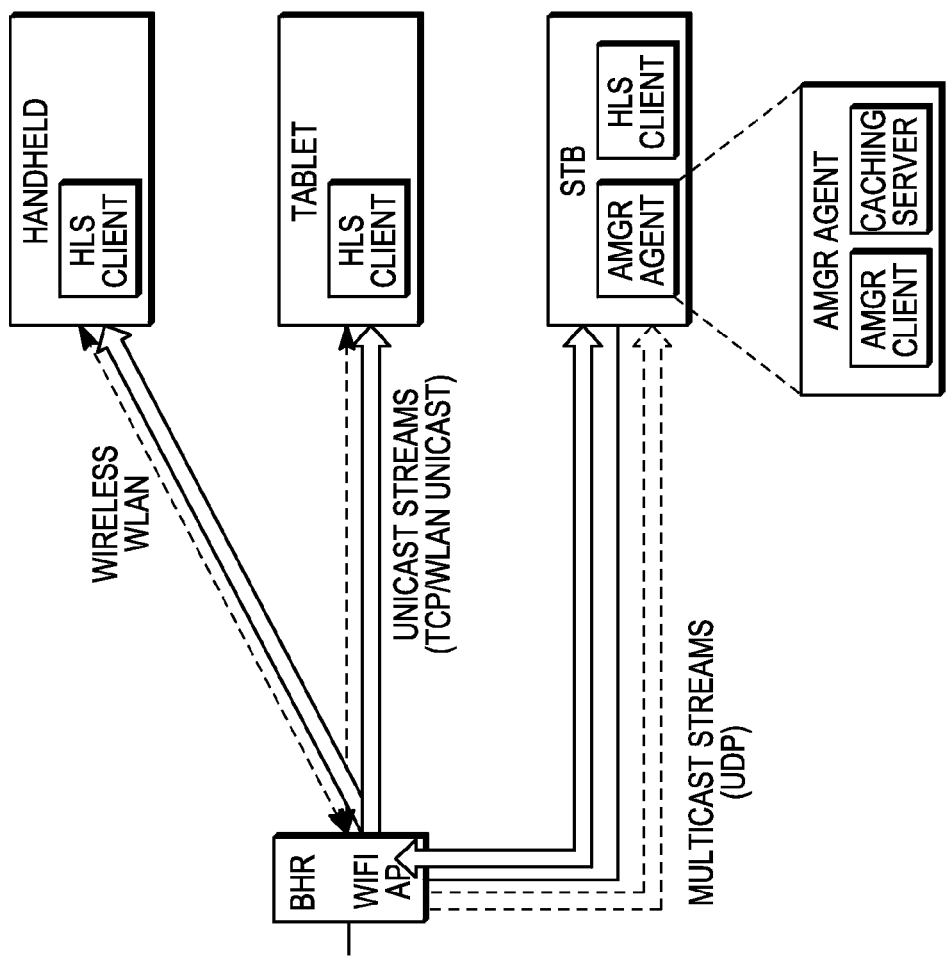
FIG. 11 is a flow chart showing operation of an AMGR.

When the AMGR Agent is located within the Setup Box (STB), the video chunks are accessed within the LAN through WiFi links, as shown in FIG. 11. In this case, HTTP Get requests from HLS Client devices within a Handheld or Tablet would reach the AMGR Agent through the WiFi links. If the chunk is available in the AMGR Agent's Caching server, the requested chunk would be transmitted by the AMGR Agent with traffic generated only within the customer's LAN. If the chunk is not available but is coming in the multicast stream, the AMGR Agent would hold the response until the chunk is ready for transmission; and if the chunk is not available and can't be available in the multicast stream, the AMGR Agent issues the HTTP Get (using the BHR-OLT path) for the missing chunk and hold the response to the HLS Client until the missing chunk arrives (in this case through unicast).

Details of the AMGR Agent Functionality

The AMGR Agent may have 4 states: AVMS_OFF, AVMS_VERIFY, AVMS_MONITOR, and AVMS_ENGAGED.

AVMS_OFF

This is the initial state of the AMGR Agent. In this state, the AMGR Agent behaves as a simple Web Cache for the HLS Client; the AMGR Agent monitors all HTTP GETs and, if it detects the request for an M3U8 file, it enters in the AVMS_VERIFY mode.

AVMS_VERIFY mode

The AMGR Agent stays in AVMS_VERIFY to determine if the HLS session is for a live event or not. While in this state, the AMGR Agent monitors all playlists received from the HLS Server If a simple playlist does NOT contain the "EXT-X-ENDLIST" tag, then the AMGR Agent enters in the AVMS_MONITOR mode; otherwise, it remains in AVMS_VERIFY mode until it times out and returns to the AVMS_OFF mode. In this state, the AMGR Agent still behaves as a simple Web Cache for the HLS Client.

AVMS_MONITOR mode

The AMGR Agent remains in AVMS_MONITOR until AMGR activates AVMS or until the session is completed. While in this state, the AMGR Agent periodically issues AVMS_JOIN messages to the AMGR. Such message informs the AMGR that there is a client involved in a Live video session (The live video session is identified by the name of the Variant playlist associated with the Live content.) The AMGR Agent keeps track of the number of the chunk and the gear used for the last download.

If the internal algorithm within the AMGR decides that it must start multicasting the live video session (e.g., there is a high enough number of client devices monitoring the particular live session) and transmits the AVMS_READY, then the AMGR Agent will join a multicast group by transmitting the IGMP JOIN message and go to the AVMS_ENGAGED mode. Otherwise, i.e., if the AMGR sends the AVMS_NOT_READY, then the AMGR Agent remains in the AVMS_MONITOR mode.

When joining a multicast group, the AMGR Agent may decide to join one or multiple multicast gears. There are many algorithms to decide which and how many multicast groups to choose. Good AMGR Agent algorithms would attempt to forecast which gear the attached HLS Clients would request. A simple way to forecast such gears is to monitor the latest gear requested by each attached HLS Client and join such multicast gear. The principle behind such choice is that HLS Clients typically avoid changing gears to avoid a poor presentation quality caused by constant switches in the gear.

AVMS_ENGAGED mode

During AVMS_ENGAGED Mode, the AMGR Agent "fills-in" the cache with chunks arriving from the Multicast Stream. If the RTP multicast separates the video and audio information, the AMGR Agent also rebuilds the TS chunks from the video and audio multicast streams. While in the AVMS_ENGAGED mode, there are 4 cases to be considered by the AMGR Agent:

Case 1: HLS Client Requests a Chunk that is Stored in the AMGR Agent:

This is the case when the HLS Client requests a chunk that has already arrived in the multicast stream. In this case, the AMGR Agent simply acts as a Caching server and transmits the chunk file to respond to the HLS Client request.

Case 2: HLS Client Requests a Chunk Number that is being Currently being Multicast by the AMGR with a Gear Number that is being Monitored by the AMGR Agent:

In this case, the AMGR Agent will delay the response to the HLS Client until the multicast (and possible TS reconstruction) is completed. The AMGR Agent will switch the gear for the next chunk if the current gear is different than the requested gear. Note: in order to maximize the chance of having the chunk being requested by the HLS Client, the AMGR Agent would consider both the chunk being transmitted in the corresponding multicast group or in any multicast group being broadcasted in the shared medium.

Case 3: HLS Client Requests a Chunk Number that is being Currently Multicast by the AMGR but with a Gear Number that is NOT being Monitored by the AMGR Agent:

In this case, the AMGR Agent requests the chunk through an HTTP GET to the HLS Server. Note: the HTTP GET request can also be made to the AMGR (which would be configured to temporarily store chunks). The AMGR Agent also switches the multicast group for future chunks. Note: the AMGR Agent may also join >1 multicast groups if desired.

If HLS Clients do not change their gears too often, case 3 would not happen too often Note that changing gears unnecessarily causes unnecessary changes in the user perception of the presentation; thus, it is expected that good HLS clients would not change gears unnecessarily In order to minimize the need to request chunks through HTTP Get to the HLS Server, the AMGR Agent shall monitor not only the multicast group corresponding to the chosen gear, but also any other multicast group that might be present in the shared medium (e.g. in a Passive Optical Network). Note that this may naturally happen when more than 1 HLS Client are being served in a LAN.

Case 4: HLS Client Requests a Chunk Number that is HIGHER than the One being Currently Multicast by the AMGR:

In this case, the AMGR Agent switches the multicast group if needed to match the gear requested by HLS Client. The AMGR Agent delays the response to the HLS Client until the multicast (and possible TS reconstruction) is completed.

We forecast that any HLS client that faces a delay in response would not face subsequent delays because it would eventually become synchronized (at the chunk level) to the multicast transmissions after the first delay.

Another possibility to minimize the delays of chunk responses to the HLS Clients is to add a delay to the playlist requests. The AMGR Agent may purposely send to the HLS Client a not-updated playlist until the new chunk is received in the multicast stream.

In cases 1, 2, and 4, HTTP Get requests from HLS Client do not make to the HLS server, saving OLT bandwidth.

In the previous architectures, the roles of the AMGR and the HTTP Adaptive Streaming Server were clearly separated. This allows the AMGR to be easily added to "legacy" HTTP Adaptive Streaming systems in a scalable and as-needed basis. Also, by placing the AMGR near the network edge, it addresses the fact that many legacy Internet routers are not configured to support multicast. However, in some deployment scenarios, the operator may have more control over the end-to-end video capture and delivery system. In this case, we can combine much of the functionalities of FIG. 1 into a single entity, called an HTTP Adaptive Multicast Router (HAMR). In fact, it is possible that a deployment may have a combination of AMGRs and HAMRs depending on expected loads, costs, and the expected mixture of carrier-controlled vs. over-the-top content. The HAMR may ingest video directly and perform transcoding, chunking, and provide HTTP adaptive streaming server capabilities. It may also connect to the Internet to provide access to other HTTP adaptive streaming servers (e.g., over-the-top content or legacy HTTP adaptive streaming servers).

Figure 12:
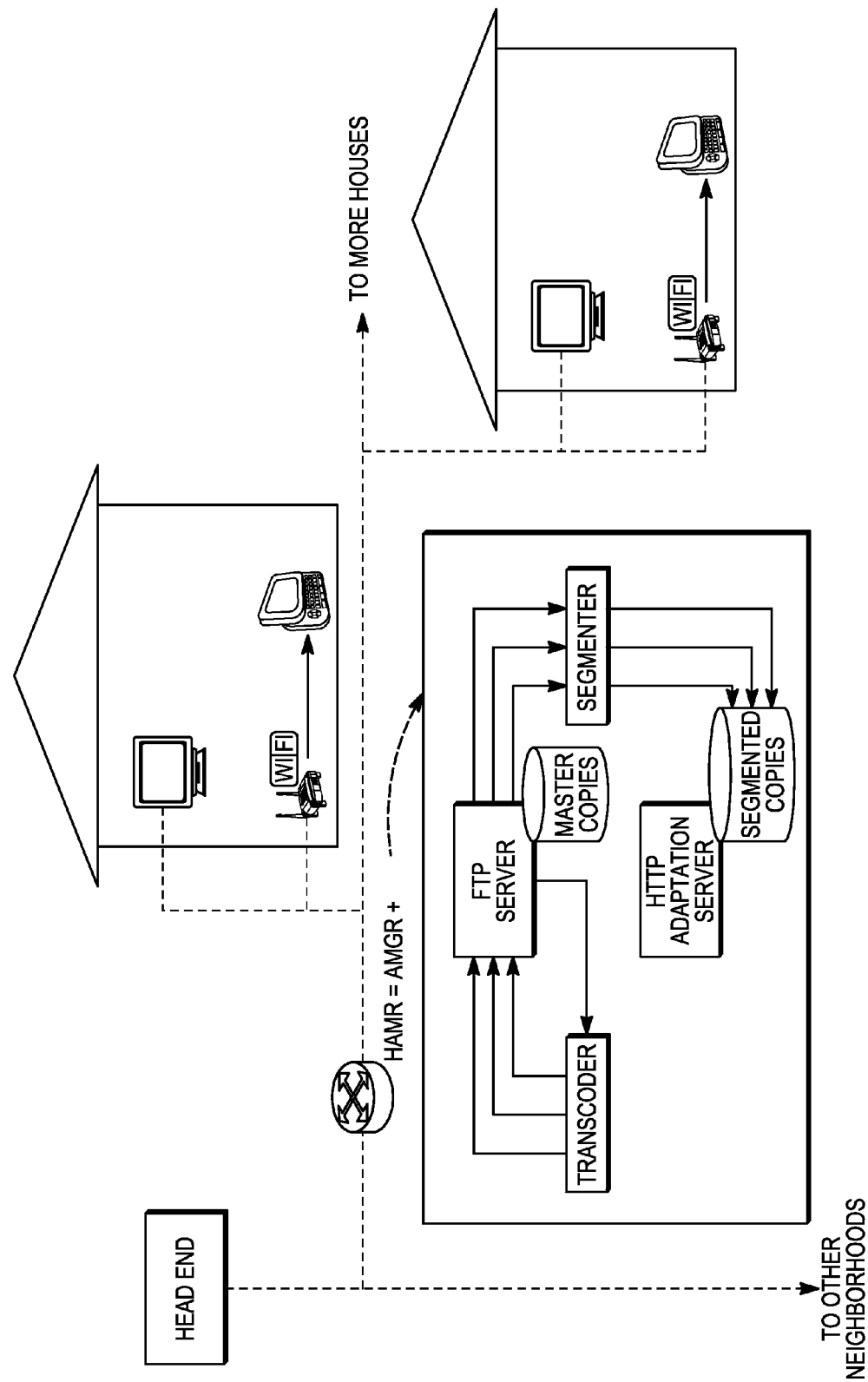
FIG. 12 illustrates an HTTP Adaptive Multicast Router.

Another scenario where the HAMR concept may be useful is shown in FIG. 12. In this figure, the scenario is an IPTV provider that installs a HAMR for a group of homes (such as one HAMR per major neighborhood or branch). The HAMR receives a high quality video stream from the head-end over any transport mechanism, such as IP unicast. The HAMR transcodes the video stream to several different bit rates (gears), chunks the transcoded video, and acts as an HTTP adaptive streaming server for the neighborhood. In addition, the HAMR acts as an AMGR and creates a multicast stream for each gear. Within a house, a wired-client (e.g., a large screen TV) can either 1) automatically subscribe to the highest quality multicast stream, without any adaptation capabilities or 2) be a full AMGR client that adapts. Also, within a house, a wireless AP/router transmits to a wireless AMGR Client. The wireless AMGR Client will behave as described earlier in this disclosure. However, note that the wireless link can be either unicast or broadcast while the IP link between the HAMR and the AMGR Client is IP multicast. The wireless AP/Router may need to be configured properly to pass IP multicast traffic. In the case of a unicast wireless link, the modulation/coding chosen by the AP can be completely independent of multicast rates, and the AMGR Client will have the responsibility for choosing an appropriate gear based on the throughput it is observing over the wireless channel or based on TCP traffic throughput between the HAMR and the AMGR Client.

Error Recovery

As the AMGR Client receives RTP packets from the multicast gear that it has joined, the AMGR Client must evaluate whether any RTP packets are corrupt and take action. There are a few methods to handle errors. In some situations, the simplest solution is to rely on the decoder. For example, an H.264 decoder can tolerate missing access units of a coded picture. The decoder simply maintains the display of the previous picture and the user experiences a small freeze in the playback. Relying on the decoder can be acceptable for either Payload Format, however the use of RFC 3984 has some advantage since it allows encapsulating individual NAL units in RTP payload. So, rather than losing an entire frame of the coded picture, the disruption can be limited to what could amount to artifacts in a single picture. However, with either payload format, some packets or portions of packets contain essential information for use by the decoder. For example, losing an RTP packet that contains the Sequence Parameter Set or Picture Parameter Set will result in the decoder not being able to properly initialize. Such errors could be dealt with by repeating essential packets, but this can be wasteful with the bandwidth and may be difficult to manage. Also, errors in the RTP packets that contain audio could be more disruptive to the user experience during playback.

Figure 13:
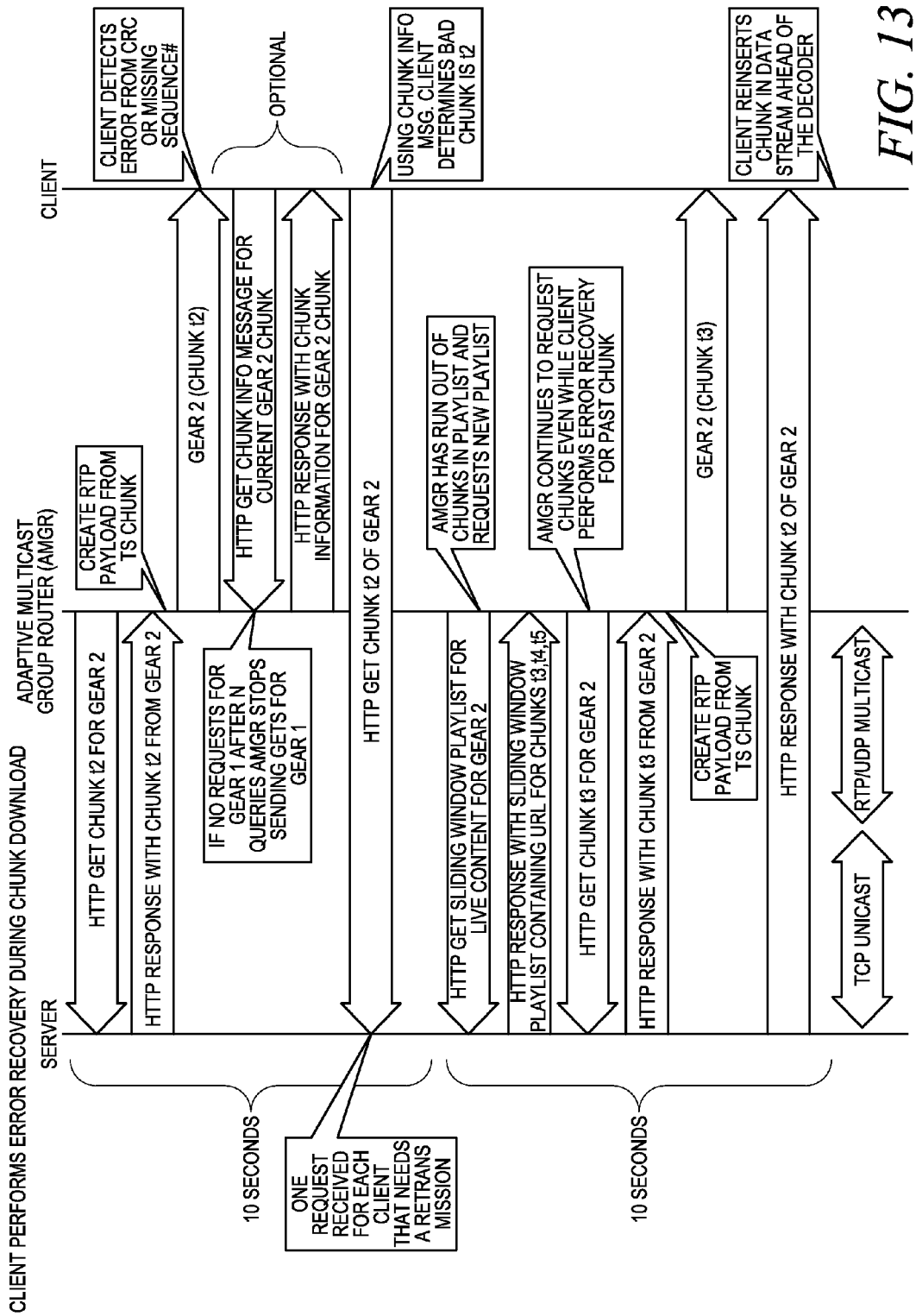
FIG. 13 is a session flow diagram for handling errors with the use of the existing TCP connection.

In the preferred embodiment, errors are handled with retransmissions over a TCP connection in parallel to the ongoing RTP multicast transmissions of the live presentation. To accomplish this, the AMGR Client identifies when an error occurs (e.g. CRC error, missing RTP sequence number/timestamp, etc.). FIG. 13 illustrates the procedure for handling errors with the use of the existing TCP connection. When an error occurs, the AMGR Client determines which chunk the error is inside of. The identity of the chunk that contains an error (or is missing) can be determined by the Chunk Information message, which is sent at the start of every chunk that is multicast. Within the Chunk Information message is the URL of the chunk in question. This URL can be sent in an HTTP Get request over the existing TCP connection with the Adaptation Server and the Adaptation Server can download the presentation chunk file over the TCP connection as a unicast message to the AMGR Client.

It is mandatory that, once the AMGR Client joins a multicast stream, the presentation playbacks of the chunk that follows the joining, not begin until the corresponding Chunk Information message is received. This is because the Chunk Information message also contains the number of RTP packets within current chunk that is being multicast. Knowing the number of expected RTP packets in a chunk enables the AMGR Client to recognize whether a Chunk Information message has been lost or discarded due to corruption. In the event that a Chunk Information message is not received (allowing for the possibility of packets being out of order), an HTTP Get request can be made for the Chunk Information message file using a TCP connection with the AMGR while the RTP packets containing the presentation are being downloaded. The AMGR Client has previously received the IP address and URL for the Chunk Information message file in the AVMS Ready message during the initialization of the multicast session. As an alternative embodiment, all AMGR Client devices may be required to request, through an HTTP GET message, the Chunk Information file for its multicast gear group at the end of every chunk. In this alternative embodiment, the server would only stream in the multicast group if at least one AMGR Client device has requested the Chunk Information file.

If the AMGR Client then determines that one of the RTP packets is in error, it can use the information in the Chunk Information message to request a retransmission of the chunk. The AMGR Client makes this request to the Adaptation Server; alternatively, when the AMGR temporarily stores the chunks, the AMGR Client makes this request to the AMGR. The request and response is an HTTP Get request and response utilizing a TCP transport. The bad chunk is then retrieved, reassembled, and re-inserted into the data stream ahead of the decoder. This implies that the AMGR Client may have to buffer the received multicast UDP stream for perhaps a couple of chunk durations, to allow time for bad chunks to be retrieved using the conventional TCP/IP protocol simultaneously with the current chunks that are being retrieved using the RTP/UDP multicast protocol.

In the event that an error occurs and a chunk or portion of a chunk must be downloaded using the TCP connection, it is a responsibility of the AMGR Client to determine if there is sufficient bandwidth to receive both the current chunk packets using the RTP/UDP multicast protocol and the errant chunk or packet using the existing TCP connection. If there is insufficient bandwidth, the AMGR Client can switch to a lower gear to give both transmissions more time to complete successfully. Alternatively, the AMGR Client could request just the missing RTP packet rather than all RTP packets of a chunk. In another alternative, the AMGR Client could request a byte range of the chunk that conservatively correlates with RTP packets that were corrupted. In addition to the AMGR Client choosing to switch to a lower gear during the error recovery, the AMGR Client may also choose to request a download of the lost or missing chunk at a lower gear in order to have less impact overall. The number of chunks in the buffer would drive this choice. For instance, if the AMGR Client buffer has only one chunk and the last chunk lost was in gear 3, the AMGR Client might want to ask for the same chunk in gear 1 to fill the buffer faster.

If the conditions for errors persist, the AMGR Client can elect to stop receiving the presentation with a multicast transmission over RTP/UDP and elect to begin receiving the presentation using the existing TCP connection through HTTP Get requests. As described in the prior art for adaptive streaming, the AMGR Client must make an HTTP Get request for the variant playlist and then the sliding window playlist that matches the current bandwidth estimation. Having the sliding window playlist, the AMGR Client can then select the URL of the next presentation chunk file that is ready to be downloaded. To stop receiving the multicast transmission, the AMGR Client must issue a Leave command to the AMGR for a particular multicast gear group address to let it know that it is no longer interested in receiving multicast packets from that multicast gear. The AMGR must decide whether other AMGR Clients are interested in continuing to receive multicasts from this particular multicast gear. In the event that the channel conditions improve, the AMGR Client can then re-join a multicast transmission of a presentation as defined previously.

In an alternate embodiment, the RTP payload could encapsulate a new container for an entire presentation chunk. This container could also contain the equivalent of the Chunk Information message, thus eliminating the need for this unique message. For example, the content of the new container could be similar to an MPEG-2 TS file. With the inclusion of the Chunk Information within the container, the failure to properly receive this payload with the new container would require the AMGR Client to immediately request the Chunk Information message from the AMGR. This would then allow the AMGR Client to request a TCP transmission of the missing chunk from the Adaptation Server. The advantage of this approach is clarity on when a new chunk transmission begins since there is only one RTP message per chunk.

In an alternate embodiment, the AMGR Client device could request a retransmission of the bad or missing chunk from the AMGR rather than from the Adaptation Server. This requires the AMGR to hold copies of the chunks for some period of time. Additionally, it requires the AMGR to take on the additional role of an HTTP server.

Normally, when using the RTP multicast specified by IEFT, an RTP Streaming Media Server transmits the presentation's RTP packets at a varying rate. This means that, during periods of time in which the RTP packets are generated at a low rate, there will be excess capacity in the channel and such excess capacity can be used for the retransmission of erroneous or missing RTP packets from the current or previous chunks. As an alternative embodiment, the AMGR (RTP Media Server) could increase the transmission rate of the chunk's RTP packets (filling in the excess capacity) in order to finish the transmission of the current chunk's RTP packets earlier than normal and the receiver could then request the retransmission of any erroneous or missing RTP packets in the time between the receipt of the last RTP packet and the beginning of the multicast of the next chunk.

Figure 14:
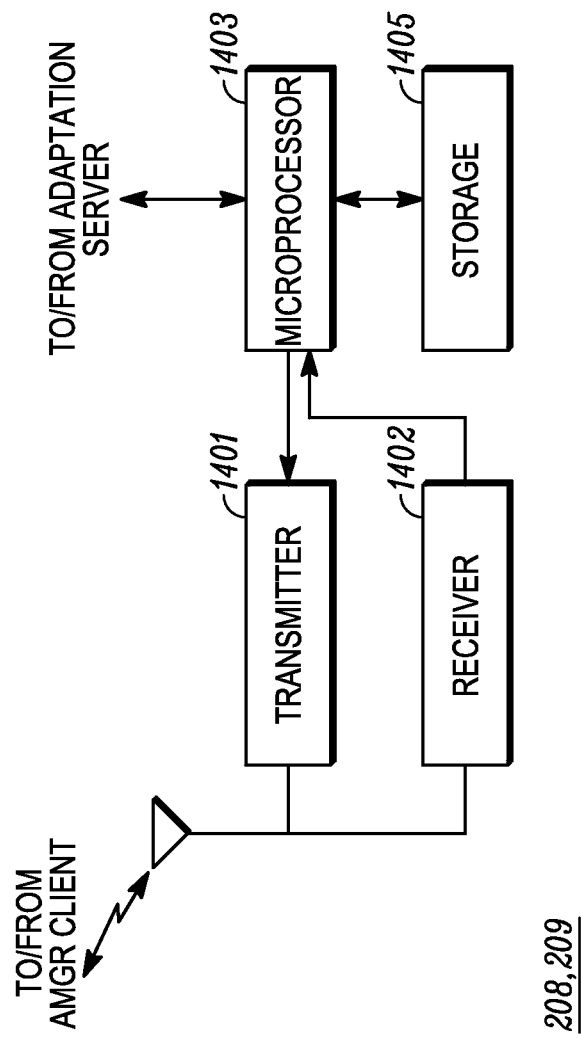
FIG. 14 is a block diagram of an AMGR.

FIG. 14 is a block diagram of an AMGR in one of the embodiments. As shown, the AMGR comprises logic circuitry (microprocessor) 1403, receive circuitry 1402, and transmit circuitry 1401. Logic circuitry 1403 preferably comprises a digital signal processor (DSP), general purpose microprocessor, a programmable logic device, or application specific integrated circuit (ASIC). Storage 1405 comprises standard random access memory and is used to store information related to client devices, their requested quality, and their group identifier. Finally, transmit and receive circuitry 1401-1402 are common circuitry known in the art for communication with clients utilizing a well known wireless communication protocol, and serve as means for transmitting presentations and receiving presentation requests for a presentation at a chosen quality. Possible transmitters and receivers include, but are not limited to transceivers utilizing Bluetooth, IEEE 802.11, or HyperLAN protocols, well known cellular system protocols such as the LTE system protocol, or the 802.16 system protocol.

During operation, receiver 1402 receives requests from a client for a particular presentation at a particular quality. This request is passed to logic circuitry 1403 where the client is groped with other clients requesting the presentation at the particular quality. Logic circuitry 1403 stores information regarding the identification of the client devices, their requested quality, and a group identifier within storage 1405. If not already done, logic circuitry 1403 requests the presentation at the particular quality from an adaptation server. As discussed above, the presentation is received from the adaptation server via TCP. Logic circuitry 1403 then utilizes transmitter 1401 to multicast the presentation at the particular quality via RTP.

Figure 15:
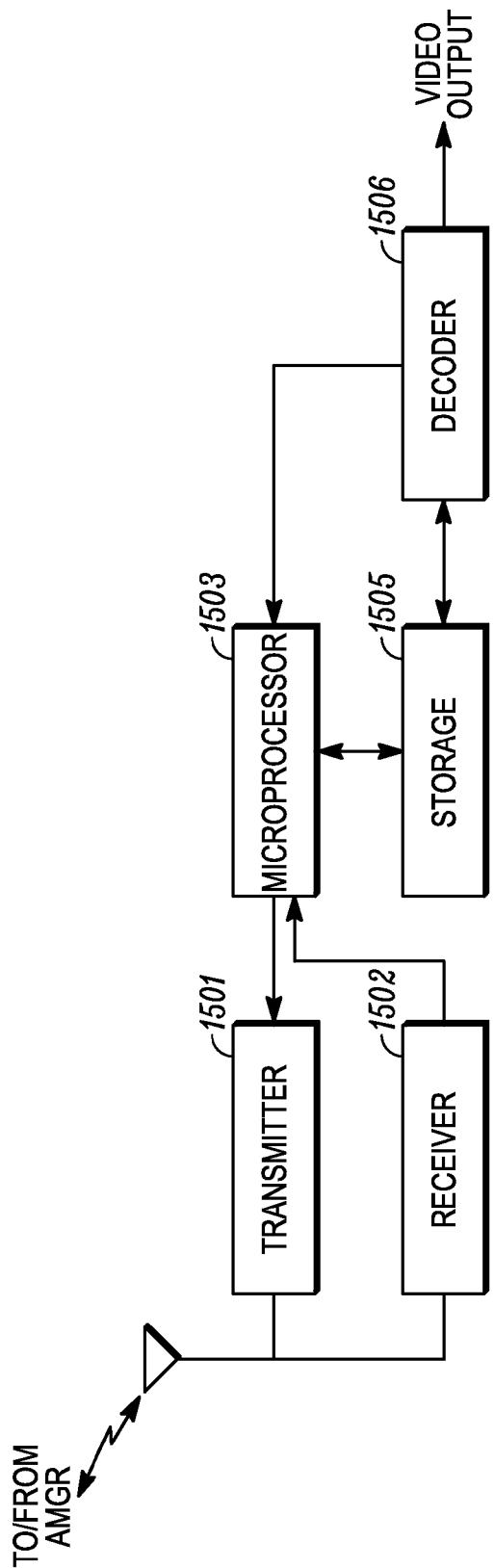
FIG. 15 is a block diagram of a client device.

FIG. 15 is a block diagram of a client device. As shown, the client device comprises logic circuitry (microprocessor) 1503, receive circuitry 1502, and transmit circuitry 1501. Logic circuitry 1503 preferably comprises a digital signal processor (DSP), general purpose microprocessor, a programmable logic device, or application specific integrated circuit (ASIC). Storage 1505 comprises standard random access memory and is used to store chunks of presentations. Decoder 1506 is a standard video decoder and serves to retrieve chunks of video from storage and appropriately decode the chunks and provide a video output to a user. Finally, transmit and receive circuitry 1501-1502 are common circuitry known in the art for communication with clients utilizing a well known wireless communication protocol, and serve as means for transmitting requests for presentations at a chosen quality and receiving presentations at the chosen quality. Possible transmitters and receivers include, but are not limited to transceivers utilizing Bluetooth, IEEE 802.11, or HyperLAN protocols, well known cellular system protocols such as the LTE system protocol, or the 802.16 system protocol. Transmit and receive circuitry 1501-1502 may also be optical transmit and receive circuitry, allowing the Logic circuitry 1503 communicate with the AMGR through an optical network; for example, a GPON network.

During operation transmitter 1501 transmits a request for a presentation at a particular quality. As discussed above, the particular quality may be determined by logic circuitry 1503 utilizing receiver 1502 to analyze the over-the-air channel quality. In response to the request, receiver 1502 receives the presentation as a multicast presentation. Microprocessor 1503 receives chunks of the presentation at the chosen quality (from receiver 1502) and stores the chunks in storage 1505. Decoder 1506 then accesses the chunks from storage and provides the video to the user.

As discussed above, decoder 1506 may determine that a particular chunk was received in error. When this happens, decoder 1506 notifies microprocessor 1503 of the error. In response, microprocessor 1503 utilizes transmitter 1501 and requests the Adaptation Server (via the AMGR) to retransmit the video chunk (or a portion of it; i.e. byte-ranging). The retransmission requests is preferably a normal HTTP Get requests used in the HLS protocol. TCP/IP is used to transport the retransmission in parallel to the ongoing video chunk downloads over RTP multicast. In other words, the retransmitted chunk is received by receiver via TCP simultaneously to receiver 1502 receiving the multicast transmission.

Figure 16:
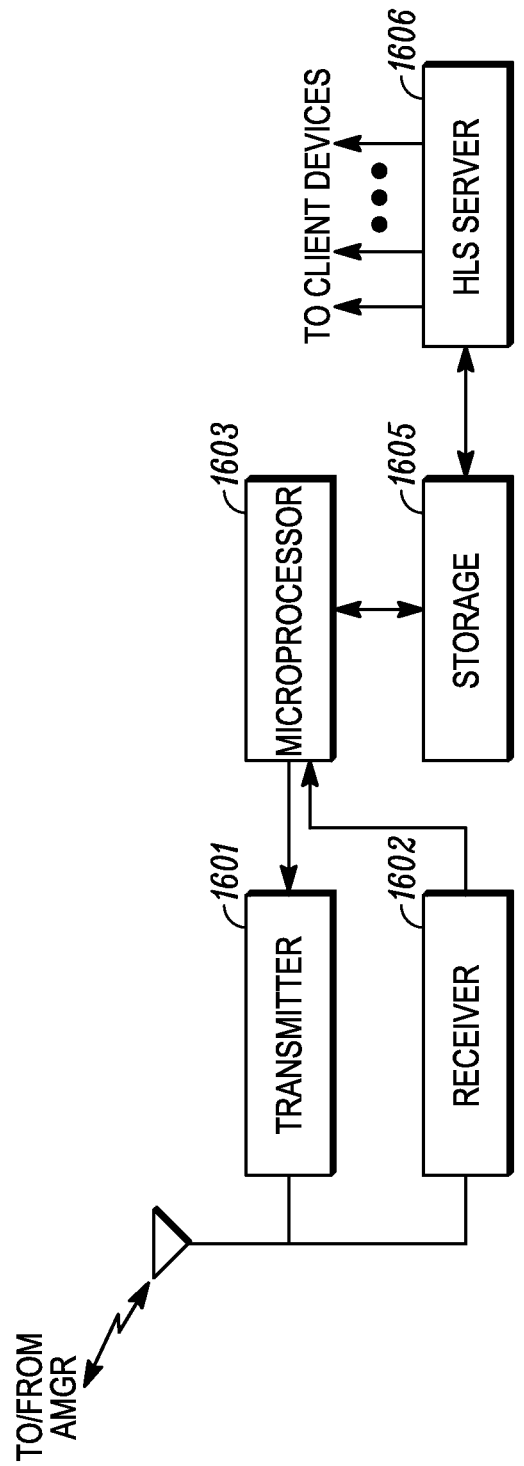
FIG. 16 is a block diagram of an AMGR agent.

FIG. 16 is a block diagram of an AMGR agent in one of the embodiments, for example agent 701. As shown, the agent 701 comprises logic circuitry (microprocessor) 1603, receive circuitry 1602, and transmit circuitry 1601. Logic circuitry 1603 preferably comprises a digital signal processor (DSP), general purpose microprocessor, a programmable logic device, or application specific integrated circuit (ASIC). Storage 1605 comprises standard random access memory and is used to store chunks of presentations. HLS Server 1606 is a standard video server designed to transport video to multiple clients via an HLS protocol. Finally, transmit and receive circuitry 1601-1602 are common circuitry known in the art for communication with clients utilizing a well known wireless communication protocol, and serve as means for transmitting requests for presentations at a chosen quality and receiving presentations at the chosen quality. Possible transmitters and receivers include, but are not limited to transceivers utilizing Bluetooth, IEEE 802.11, or HyperLAN protocols, well known cellular system protocols such as the LTE system protocol, or the 802.16 system protocol. Transmit and receive circuitry 1601-1602 may also be optical transmit and receive circuitry, allowing the Logic circuitry 1603 communicate with the AMGR through an optical network; for example, a GPON network.

During operation, transmitter 1601 transmits a request for a presentation at a particular quality (i.e. a request to join a multicast group). In one embodiment, a request is made to join all multicast groups being transmitted. In response to the request, receiver 1602 receives the presentation as at least one multicast presentation. Microprocessor 1603 receives chunks of the presentation at a particular quality (from receiver 1502) and stores the chunks in storage 1605.

At this point HLS server 1606 retrieves the chunks identifying chunk information for the received presentation. Based on the chunk information and the received presentation, server 1606 generates chunks for the presentation at the first and second qualities. These chunks are provided to at least a first client at a first quality, and in other embodiments, the chunks are provided to multiple clients at their requested quality over a unicast connection.

Figure 17:
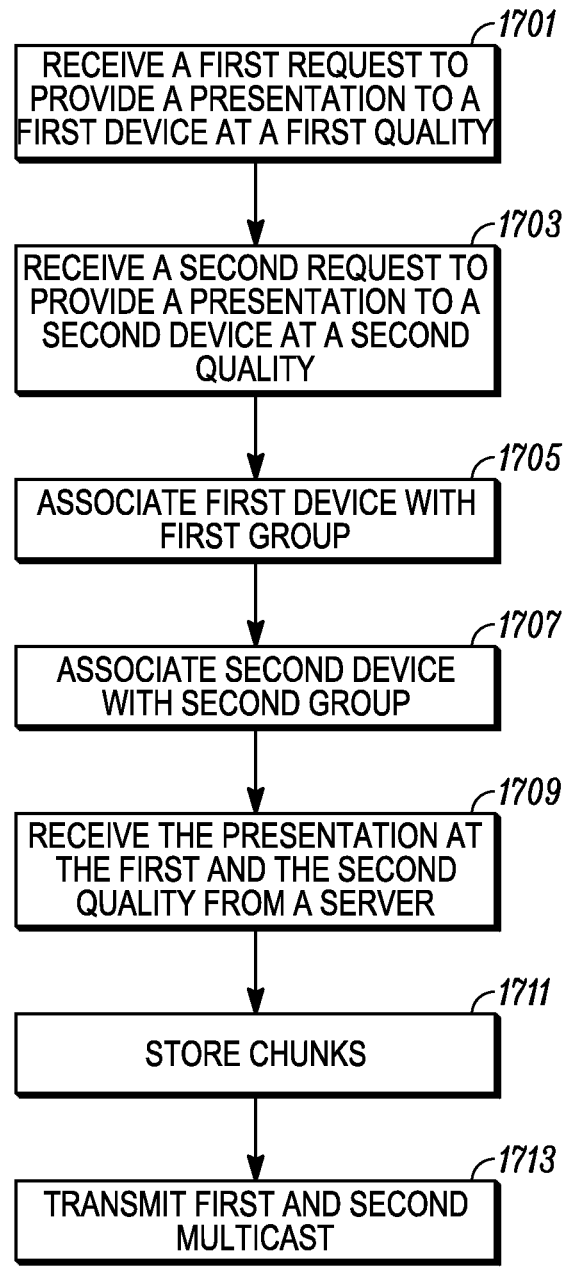
FIG. 17 is a flow chart showing operation of the AMGR of FIG. 14

FIG. 17 is a flow chart showing operation of the AMGR of FIG. 14. The logic flow begins at step 1701 where receiver 1402 receives a first request to provide a presentation to a first device at a first quality. At step 1703, receiver 1402 receives a second request to provide the presentation to a second device at a second quality. Logic circuitry 1403 then associates the first device with a first group of devices all requesting the presentation at the first quality (step 1705) and associates the second device with a second group of devices all requesting the presentation at the second quality (step 1707). At step 1709 logic circuitry 1403 then receives the presentation at the first and the second quality from a server (e.g., adaptation server 205). This step preferably comprises receiving the presentation as chunks over a unicast transmission (for example TCP). At step 1711 logic circuitry then stores the chunks in database 1405. This step of storing the chunks may comprise formatting the chunks for multicast transmission and inserting chunk information at a chunk boundary of the formatted chunks, prior to storing the chunks.

At step 1713 logic circuitry 1403 instructs transmitter 1401 to transmit a first multicast of the presentation to the first group of devices at the first quality and transmit a second multicast of the presentation to the second group of devices at the second quality. Preferably, the multicast is an RTP multicast. As discussed above, the first multicast and the second multicast have differing modulation and coding rates. Preferably chunk information is provided with formatted chunks as part of the multicast.

Figure 18:
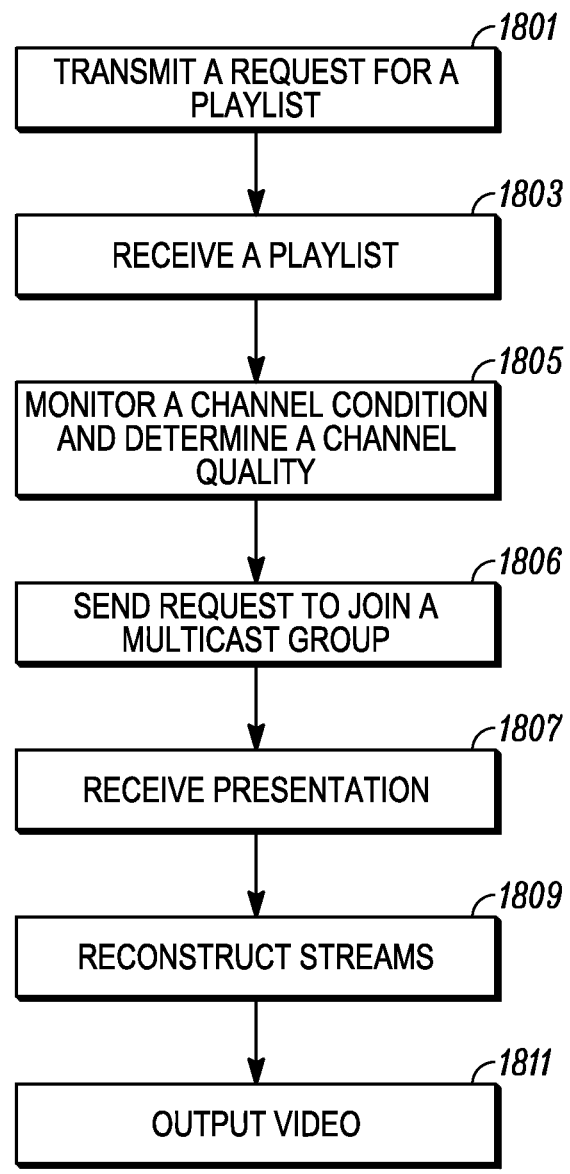
FIG. 18 is a flow chart showing operation of the client device of FIG. 15.

FIG. 18 is a flow chart showing operation of the client device of FIG. 16. The logic flow begins at step 1801 where transmitter 1501 transmits a request for a presentation playlist from a server. The playlist is received from the server at step 1803 and based on the playlist logic circuitry 1503 determines to receive the presentation by multicast. It should be noted that the presentation may be received either by unicast or multicast. More particularly, the presentation may be received as either a multicast over RTP or a unicast over TCP.

At step 1805 receiver 1502 monitors channel conditions and microprocessor 1503 determines a channel quality (channel quality preferably comprises a quality of a downlink over-the-air channel). At step 1806, logic circuitry 1503 then instructs transmitter 1501 to send a request to join a multicast group to receive the presentation based on the channel conditions. At step 1807 the presentation is received via multicast and stored in storage 1505. Decoder then locates chunk boundaries and reconstructs elementary streams based on the chunk boundaries (step 1809). The resulting video is then output (step 1811). It should be noted that logic circuitry 1503 may again determine channel conditions and choose to join a second multicast group based on the channel conditions. The switch to the second group may be completed at a chunk boundary after the chunk boundary has been identified.

Figure 19:
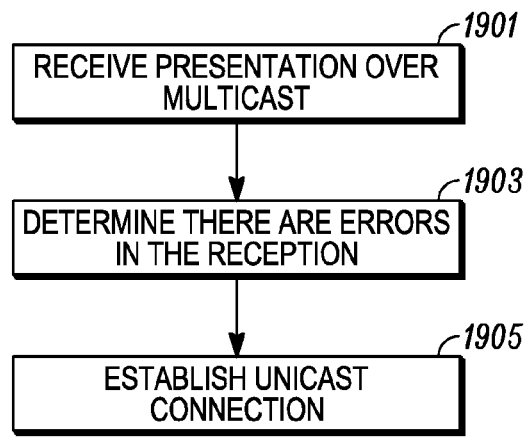
FIG. 19 is a flow chart showing the steps necessary for error correction.

As discussed above, error correction may be initiated by setting up a simultaneous unicast connection to receive portions of the presentation that were received in error. FIG. 19 is a flow chart showing the steps necessary for error correction.

The logic flow begins at step 1901 where a presentation is received over a multicast transmission. Logic circuitry 1503 then determines that there were errors in the reception of the presentation (step 1903). In response to the determination that there were errors, a simultaneous unicast connection is established to receive portions of the presentation that were received in error (step 1905). It should be noted that in one embodiment the step of determining that there were errors comprises determining chunk boundaries and whether there were any errors between the chunk boundaries. Additionally the step receiving portions of the presentation that were received in error comprises the step of receiving at least a portion of a chunk of the presentation received in error.

Figure 20:
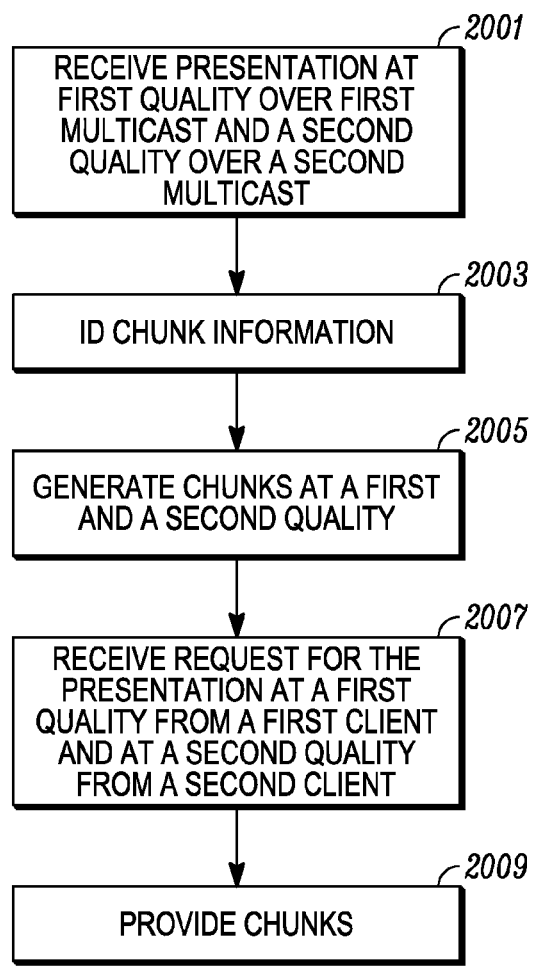
FIG. 20 is a flow chart showing operation of the AMGR agent of FIG. 16.

FIG. 20 is a flow chart showing operation of the AMGR agent of FIG. 16. The logic flow begins at step 2001 where receiver 1602 receives a presentation at a first quality over a first multicast connection and receives the presentation at a second quality over a second multicast connection. As discussed above, the step of receiving the presentation at the first quality over the first multicast connection comprises the step of joining a first multicast group to receive the presentation. Likewise, the step of receiving the presentation at the second quality over the second multicast connection comprises the step of joining a second multicast group to receive the presentation.

Logic circuitry 1603 then identifies chunk information for the received presentation (step 2003) and then based on the chunk information and the received presentation, logic circuitry 1603 generates chunks for the presentation at the first and second qualities (step 2005). The step of identifying chunk information for the received presentation comprises receiving the multicast data, identifying chunk boundaries from chunk boundary information embedded in the multicast data, and reconstructing the chunk.

HLS server 1606 receives a request (e.g., an HTTP GET request) from a client for the presentation at the first quality from a first client and a request for the presentation at the second quality from a second client (step 2007). The request may simply be for chunks of a presentation at a given quality. Regardless, once the request is received, at step 2009 the chunk is provided by HLS Server 1606 at the first quality to the first client and at the second quality to the second client. In a preferred embodiment the step of providing the chunk comprises the step of transmitting the chunk on a unicast (e.g., TCP) connection.

Figure 21:
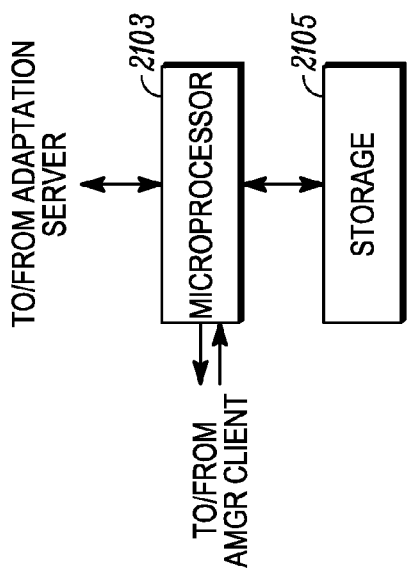
FIG. 21 is a block diagram of an AMGR in accordance with one of the alternate embodiments.

FIG. 21 is a block diagram of an AMGR in one of the alternate embodiments. As shown, the AMGR comprises logic circuitry (microprocessor) 2103 and storage 2105. Logic circuitry 2103 preferably comprises a digital signal processor (DSP), general purpose microprocessor, a programmable logic device, or application specific integrated circuit (ASIC). Storage 2105 comprises standard random access memory and is used to store information related to client devices, their requested quality, and their group identifier. The Microprocessor 2103 has networking circuitry that serves as a means for transmitting presentations and receiving presentation requests for a presentation at a chosen quality. Possible networking circuitry include, but are not limited to Ethernet, SONET, or ATM, and may use well known protocols such as TCP/IP.

During operation, microprocessor 2103 receives requests from a client for a particular presentation at a particular quality through its networking circuitry. The client is grouped with other clients requesting the presentation at the particular quality. Microprocessor 2103 stores information regarding the identification of the client devices, their requested quality, and a group identifier within storage 2105. If not already done, microprocessor 2103 requests the presentation at the particular quality from an adaptation server. As discussed above, the presentation is received from the adaptation server via TCP. Microprocessor 2103 then uses its networking circuitry to multicast the presentation at the particular quality via RTP.

Figure 22:
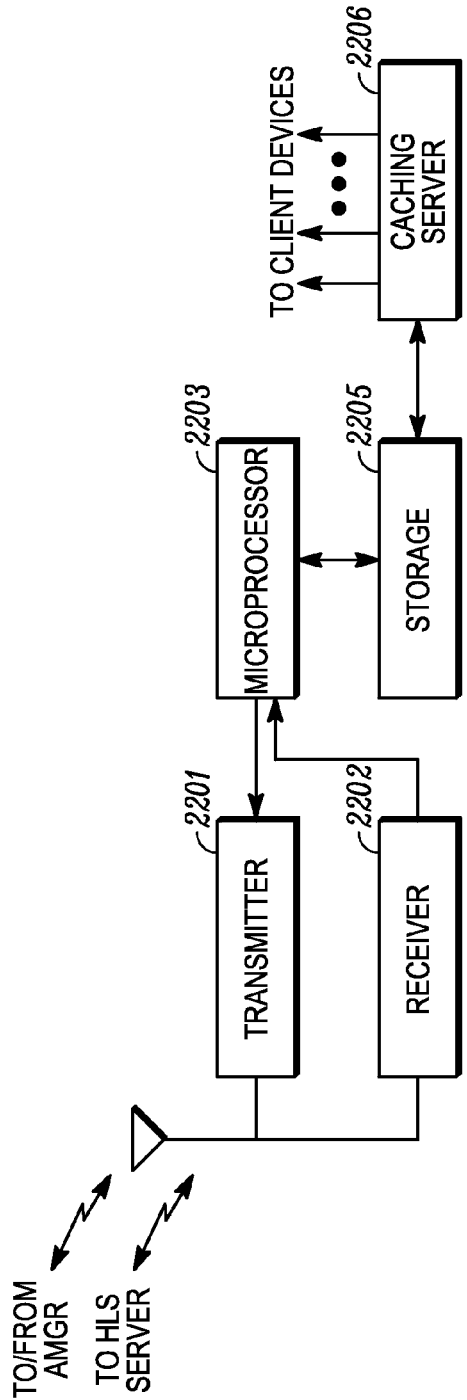
FIG. 22 is a block diagram of an AMGR agent in accordance with one of the alternative embodiments Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. Those skilled in the art will further recognize that references to specific implementation embodiments such as "circuitry" may equally be accomplished via replacement with software instruction executions either on general purpose computing apparatus (e.g., CPU) or specialized processing apparatus (e.g., DSP). It will also be understood that the terms and expressions used herein have the ordinary technical meaning as is accorded to such terms and expressions by persons skilled in the technical field as set forth above except where different specific meanings have otherwise been set forth herein.

FIG. 22 is a block diagram of an AMGR agent in one of the alternative embodiments, for example agent 701. As shown, the agent 701 comprises logic circuitry (microprocessor) 2203, receive circuitry 2202, and transmit circuitry 2201. Logic circuitry 2203 preferably comprises a digital signal processor (DSP), general purpose microprocessor, a programmable logic device, or application specific integrated circuit (ASIC). Storage 2205 comprises standard random access memory and is used to store chunks of presentations. Caching Server 2206 is a server designed to temporarily hold chunks for prompt answer when requested by an HLS Client (not represented) via an HLS protocol. Finally, transmit and receive circuitry 2201-2202 are common circuitry known in the art for communication with clients utilizing a well known wireless communication protocol, and serve as means for transmitting requests for presentations at a chosen quality and receiving presentations at the chosen quality. Possible transmitters and receivers include, but are not limited to transceivers utilizing Bluetooth, IEEE 802.11, or HyperLAN protocols, well known cellular system protocols such as the LTE system protocol, or the 802.16 system protocol. Transmit and receive circuitry 2201-2202 may also be optical transmit and receive circuitry, allowing the Logic circuitry 2203 communicate with the AMGR or with the HLS Server through an optical network; for example, a GPON network.

During operation, Caching Server 2206 intercepts requests from Client Devices for a particular chunk at a particular quality. If Caching Server 2206 contains the requested chunk in the Storage 2205, then it readily replies to the Client Device with the requested Chunk; otherwise, Logic Circuitry 2203 forwards the chunk request to the HLS Server using Transmitter 2201. When the requested chunk arrives in Receiver 2202, it is stored in Storage 2205 and is transmitted to the Client Device by the Caching Server 2206.

In parallel to this operation, the Logic Circuitry 2203 communicates with the AMGR, also using Transmitter 2201 and Receiver 2202. In this operation, the Logic Circuitry 2203 attempts to anticipate the requests from HLS Clients. During this operation, transmitter 2201 transmits a request for a presentation at a particular quality (i.e. a request to join a multicast group). In one embodiment, a request is made to join all multicast groups being transmitted. In response to the request, receiver 2202 receives the presentation as at least one multicast presentation or receives a specific chunk at a specific quality. Logic Circuitry 2203 receives chunks of the presentation at a particular quality (from receiver 2202), stores the chunks in storage 2205, and makes them available for the Caching Server 2206. Based on the chunk information and the received presentation, the Caching Server 2206 answers to chunk requests for the presentation at the first and second qualities. These chunks are provided to at least a first client at a first quality, and in other embodiments, the chunks are provided to multiple clients at their requested quality over a unicast connection.

While the invention has been particularly shown and described with reference to a particular embodiment, it will be understood by those skilled in the art that various changes in form and details may be made therein without departing from the spirit and scope of the invention. For example, Throughout this disclosure, we focus on HLS solutions, servers, and clients; however, the concepts are equally applicable to other HTTP/TCP-based adaptive streaming solutions, such as Microsoft Smooth Streaming or any of the solutions currently being developed in standardization bodies (3GPP, OIPTV, MPEG), servers, and clients. It is intended that such changes come within the scope of the following claims:

The invention claimed is:

1. A method for operating a client device, the method comprising the steps of:
   requesting a presentation playlist from a first server;
   receiving the playlist from the first server;
   determining whether additional servers can receive a multicast stream of the presentation;
   determining to receive the presentation by multicast based further on the received playlist, wherein the presentation may be received as either multicast or unicast;
   sending a message to the additional servers to request an initiation of a multicast stream of the presentation from one or more of multicast groups;
   determining channel conditions;
   requesting to join the one or more multicast groups to receive the presentation at different resolutions which are included in the channel conditions;
   receiving the presentation via multicast;
   locating boundaries of chunks based on the playlist; and
   reconstructing the chunks of the video stream based on the chunk boundaries for each of the different resolutions.

2. The method of claim 1 wherein the presentation may be received as either a multicast over RTP or a unicast over TCP.

3. The method of claim 1 wherein the step of determining channel conditions comprises the step of determining a quality of a downlink over-the-air channel.

4. The method of claim 1 further comprising the steps of:
   storing the reconstructed chunks; and
   transmitting the stored chunks to the additional servers.

5. The method of claim 1 further comprising the steps of:
   receiving the presentation over a multicast transmission;
   determining that there exist errors in the reception of the presentation; and
   in response to the determination that there were errors, setting up a simultaneous unicast connection to receive portions of the presentation that were received in error.

6. The method of claim 5 wherein:
   the step of determining that there were errors comprises the step of determining chunk boundaries and whether there were any errors between the chunk boundaries; and
   the step of receiving portions of the presentation that were received in error comprises the step of receiving at least a portion of a chunk of the presentation received in error.

* * * * *